United States Patent

Matsumoto et al.

[11] Patent Number: 5,822,298
[45] Date of Patent: Oct. 13, 1998

[54] RING TRANSMISSION SYSTEM FOR PROVIDING EFFICIENT TRANSMISSION OF MANAGEMENT DATA

[75] Inventors: Tsuyoshi Matsumoto, Kawasaki; Noriyuki Kimura, Kanazawa; Kenji Taniguchi, Kawasaki; Takashi Tai, Kanazawa; Hiroaki Nagao; Masashi Hirome, both of Kawasaki, all of Japan

[73] Assignee: Fujitsu Limited, Kanagawa, Japan

[21] Appl. No.: 687,235

[22] Filed: Jul. 25, 1996

[30] Foreign Application Priority Data

Dec. 29, 1995 [JP] Japan .................................. 7-353111

[51] Int. Cl.$^6$ .................................................. H04J 3/14
[52] U.S. Cl. ........................... 370/223; 370/235; 370/242
[58] Field of Search ..................... 370/222, 223, 370/224, 450, 452, 249, 522, 235, 242, 395, 397, 403, 410; 340/825.05, 827

[56] References Cited

U.S. PATENT DOCUMENTS

| 5,150,356 | 9/1992 | Tsutsui | 370/223 |
| 5,179,553 | 1/1993 | Tanaka | 370/452 |
| 5,315,582 | 5/1994 | Morizono et al. | 370/222 |
| 5,440,540 | 8/1995 | Kremer | 370/223 |
| 5,461,607 | 10/1995 | Miyagi et al. | 370/397 |

*Primary Examiner*—Chau Nguyen
*Attorney, Agent, or Firm*—Helfgott & Karas, P.C.

[57] ABSTRACT

A ring transmission system includes nodes connected in a ring shape by transmission lines to communicate with each other. Each node includes a cell extracting unit which receives a cell from the transmission lines and separates a control field from the cell in accordance with a communication control procedure, the control field including a number of bits containing management data and a destination, the management data indicating information related to maintenance and operation of the ring transmission system. A separating unit separates, from the control field, one of management data for the node and management data for another node by comparing the destination with an identification of the node. A management data processing unit generates processed management data from the management data when the destination indicates the node. An intermediate unit generates a new cell containing the management data from the separating unit when the destination indicates the another node. The management data of the new cell is distinctly different from the processed management data. The intermediate unit transmits the new cell to the transmission lines.

19 Claims, 21 Drawing Sheets

RING TRANSMISSION SYSTEM FOR PROVIDING EFFICIENT TRANSMISSION OF MANAGEMENT DATA

BACKGROUND OF THE INVENTION (1) Field of the Invention

The present invention relates to a ring transmission system in which nodes are connected in a ring shape by transmission lines to communicate with one another, each node providing a communication interface as one of a source node, a destination node and an intermediate node when a cell from the source node is transmitted to the destination node via the intermediate node.

(2) Description of the Related Art

In local area networks (LANs), nodes are connected in various configurations and the nodes are collectively arranged in a relatively small area. Calls from the nodes are evenly presented on the LAN regardless of whether the relative distance between the source node and the destination node is great or small.

Taking into consideration the purpose of increasing the efficiency of traffic processing on the transmission lines and the reliability of data transmitted or received, it is appreciated that network systems in which nodes are linked in star, bus or lattice formations are not appropriate, and network systems in which nodes are linked in a ring formation are appropriate. The network systems of the latter have become popular in recent years.

Hereinafter, a network system in which nodes are connected to one another in the shape of a closed loop, or in a ring shape, so that each node is connected directly to two other nodes, one on either side of it, is called a ring transmission system.

FIG. 1 shows a conventional ring transmission system. Referring to FIG. 1, the conventional ring transmission system includes transmission lines with a redundant structure and nodes with a redundant structure. The nodes are connected in a ring shape by the transmission lines.

The conventional ring transmission system includes first transmission lines $142_1$ and second transmission lines $142_2$ which provide the redundant structure of the transmission lines for this system. Nodes $141_{11}$ through $141_{1N}$ are connected in a ring shape by the first transmission lines $142_1$, and nodes $141_{21}$ through $141_{2N}$ are connected in a ring shape by the second transmission lines $142_2$. The nodes $141_{11}$ through $141_{1N}$ and the nodes $141_{21}$ through $141_{2N}$ provide the redundant structure of the nodes for this system.

The nodes $141_{11}$ and $141_{21}$, the nodes $141_{12}$ and $141_{22}$, . . . , and the nodes $141_{1N}$ and $141_{2N}$ are connected to processing units $143_1$, $143_2$, . . . , and $143_N$, respectively.

As shown in FIG. 1, the node $141_{11}$ which is one of the nodes on the network includes an extracting unit $144_{11}$, a header analysis unit $145_{11}$, a receiving buffer $146_{11}$, a transmitting buffer $147_{11}$, an interface unit $148_{11}$, and an inserting unit $149_{11}$.

In the node $141_{11}$, an output line of the first transmission lines $142_1$ is connected to the extracting unit $144_{11}$, and the extracting unit $144_{11}$ is connected to the header analysis unit $145_{11}$. The header analysis unit $145_{11}$ is connected to an input of the receiving buffer $146_{11}$. A message from the output line of the first transmission lines $142_1$ is written to the receiving buffer $146_{11}$.

An output of the receiving buffer $146_{11}$ is connected to the processing unit $143_1$ via a connecting line. An input of the transmitting buffer $147_{11}$ is connected to the processing unit $143_1$ via the connecting line. A bus terminal of the receiving buffer $146_{11}$ and a bus terminal of the transmitting buffer $147_{11}$ are connected to input/output ports of the processing unit $143_1$ via the interface unit $148_{11}$.

An output of the transmitting buffer $147_{11}$ is connected to the inserting unit $149_{11}$, and the inserting unit $149_{11}$ is connected to an input line of the first transmission lines $142_1$.

The nodes $141_{12}$ through $141_{1N}$ are the same as the above node $141_{11}$, and a description thereof will be omitted. In addition, the nodes $141_{21}$ through $141_{2N}$ are the same as the above node $141_{11}$ except that they are interconnected by the second transmission lines $142_2$, not the first transmission lines $142_1$, and a description thereof will be omitted.

The elements of the nodes $141_{12}$ through $141_{1N}$ and the nodes $141_{21}$ through $141_{2N}$ which are the same as corresponding elements of the node $141_{11}$ are designated by the same reference numerals to which subscripts which are the same as corresponding subscripts of the respective nodes are attached.

In the conventional ring transmission system, a link for transmitting and receiving monitoring data is formed by a predetermined path among the nodes $141_{11}$ through $141_{1N}$ on the transmission lines $142_1$ and the nodes $141_{21}$ through $141_{2N}$ on the transmission lines $142_2$. The monitoring data is used to perform monitoring and control related to the maintenance and operation of the ring transmission system. The predetermined path is fixed in advance and unchanged.

The processing unit $143_1$ accesses data of the transmitting buffer $147_{11}$ via the interface unit $148_{11}$ to perform management of recording areas of the transmitting buffer $147_{11}$. When management data which is to be sent from the node $141_{11}$ to one of the nodes $141_{12}$ through $141_{1N}$ and the nodes $141_{21}$ through $141_{2N}$ through the transmission lines $142_1$ is given, the processing unit $143_1$ writes the management data to the transmitting buffer $147_{11}$ by performing the management of the recording areas thereof.

The inserting unit $149_{11}$ recognizes a timing of transmission from the node $141_{11}$ to another node in accordance with a communication control procedure of the first transmission lines $142_1$. When management data to be transmitted is stored in the transmitting buffer $147_{11}$, the inserting unit $149_{11}$ transmits the management data at the timing to the first transmission lines $142_1$.

The node $141_{11}$ receives management data from the transmission lines $142_1$ by performing the communication control procedure. For the sake of simplicity, it is supposed that the node $141_{11}$ receives a frame containing a destination of the management data.

When the management data is received from the transmission lines $142_1$, the extracting unit $144_{11}$ sends the management data to the header analysis unit $145_{11}$.

The header analysis unit $145_{11}$ manages recording areas of the receiving buffer $146_{11}$. The header analysis unit $145_{11}$ separates the destination from the management data (or the frame) in accordance with the format of the management data from the extracting unit $144_{11}$. The header analysis unit $145_{11}$ stores the management data and the destination thereof in the recording areas (where data is not yet stored) of the receiving buffer $146_{11}$. Information indicating a correspondence between the management data and the destination in the receiving buffer $146_{11}$ is recognized by the header analysis unit $145_{11}$.

The processing unit $143_1$ accesses the data of the receiving buffer $146_{11}$ via the interface unit $148_{11}$, and receives the management data and the destination from the receiving buffer $146_{11}$.

When the received destination indicates that the management data is for the node $141_{11}$, the processing unit $143_1$ acquires the management data in the receiving buffer $146_{11}$ of the node $141_{11}$.

When the received destination indicates that the management data is for another node, the processing unit $143_1$ performs an intermediate transmission of the management data to the another node. In this intermediate transmission, the transmitting buffer $147_{11}$ and the inserting unit $149_{11}$ are controlled in a manner similar to the above-described manner so that the management data is transmitted to the transmission lines $142_1$.

Operations of the nodes $141_{12}$ through $141_{1N}$ and the nodes $141_{21}$ through $141_{2N}$ are the same as the operation of the node $141_{11}$ described above, and a description thereof will be omitted.

Instead of the above-described communication control procedure, one of a token-ring method, a token-bus method, a slotted ring method, an asynchronous transfer method, and the like may be utilized depending on the quantity of transmitted data, the frequency of generating management data, the configuration of the network, and the length of management data. Since the communication control procedure is not related to the present invention, a description thereof will be omitted.

In the conventional ring transmission system, each node is connected to a processing unit with which it executes programs. However, when there are a great number of intermediate nodes between the source node and the destination node on the transmission lines, intermediate transmissions of the management data from node to node are individually performed by the intermediate nodes and the processing units connected thereto. It is difficult for the conventional ring transmission system to efficiently transmit the management data from the source node to the destination node regardless of whether the number of the intermediate nodes is great or small. In the case of the conventional ring transmission system, the greater the number of the intermediate transmissions is, the lower the efficiency of the transmission of the management data is.

In the conventional ring transmission system, a fixed amount of the capacity of data communication on the transmission lines $142_1$ and $142_2$ is allocated for the transmission of the management data from the source node to the destination node. The efficiency of the transmission of the conventional ring transmission system becomes considerably low when the quantity of traffic on the transmission lines in the network is great. It is difficult for the conventional ring transmission system to provide an adequate amount of the capacity of data communication originally allocated to transmit the management data regardless of whether the quantity of traffic on the transmission lines is great or small.

SUMMARY OF THE INVENTION

An object of the present invention is to provide an improved ring transmission system in which the above-mentioned problems are eliminated.

Another object of the present invention is to provide a ring transmission system which provides an efficient transmission of the management data from the source node to the destination node regardless of whether the number of the intermediate nodes is great or small.

Still another object of the present invention is to provide a ring transmission system which provides an adequate amount of the capacity of data communication for the transmission of the management data regardless of whether the quantity of traffic on the transmission lines is great or small.

A further object of the present invention is to provide a ring transmission system which provides an efficient transmission of the management data from the source node to the destination node even when the construction of the nodes and the transmission lines in the system is modified in various ways.

The above-mentioned objects of the present invention are achieved by a ring transmission system which includes nodes connected in a ring shape by transmission lines to communicate with one another, each of the nodes providing a communication interface as one of a source node, a destination node and an intermediate node when a cell from the source node is transmitted to the destination node via the intermediate node on the transmission lines. Each node includes a cell extracting unit which receives the cell from the transmission lines and separates a control field from the cell in accordance with a communication control procedure used by the transmission lines, the control field including a number of bits, separatable from message data included in the cell, containing management data and a destination, the management data indicating information related to maintenance and operation of the ring transmission system. A separating unit separates, from the control field from the cell extracting unit, one of management data for the node and management data for another node by comparing the destination with an identification of the node. A management data processing unit generates processed management data from the management data supplied by the separating unit when the destination indicates that the management data is for the node. An intermediate unit generates a new cell containing the management data supplied by the separating unit and the destination when the destination indicates that the management data is for the another node, the management data of the new cell being distinctly different from the processed management data generated by the management data processing unit, the intermediate unit transmitting the new cell to the transmission lines. (already finished)

The above-mentioned objects of the present invention are achieved by the ring transmission system which further includes secondary transmission lines connected to the transmission lines in a closed loop and using a communication control procedure which is the same as the communication control procedure of the transmission lines. A connection converting unit is provided on the transmission lines and connects the transmission lines to the secondary transmission lines to allow extension of the transmission lines. Secondary nodes are connected in a ring shape by the secondary transmission lines, the secondary nodes on the secondary transmission lines being the same as the nodes on the transmission lines.

The above-mentioned objects of the present invention are achieved by the ring transmission system which further includes a plurality of groups of sub-transmission lines respectively connected to the transmission lines in a closed loop and using a communication control procedure which is the same as the communication control procedure of the transmission lines. Secondary nodes are individually connected in a ring shape by one of the groups of sub-transmission lines, the secondary nodes on the groups of sub-transmission lines being the same as the nodes on the transmission lines. A switching device is provided on the transmission lines and selectively connects the transmission lines to one of the groups of sub-transmission lines. The switching device selects the one of the groups to which the transmission lines are connected when the cell is transmitted to one of the secondary nodes on the one of the groups of sub-transmission lines.

The ring transmission system of the present invention can provide an efficient transmission of the management data from the source node to the destination node even when the construction of the nodes and the transmission lines in the system is modified in various manners. In addition, the ring transmission system of the present embodiment can provide an adequate amount of the capacity of data communication to transmit the management data regardless of whether the quantity of traffic on the transmission lines is great or small. Further, the ring transmission system of the present invention can provide an efficient transmission of the management data from the source node to the destination node regardless of whether the number of the intermediate nodes is great or small.

BRIEF DESCRIPTION OF THE DRAWINGS

The above and other objects, features and advantages of the present invention will become more apparent from the following detailed description when read in conjunction with the accompanying drawings in which.

DETAILED DESCRIPTION OF THE PREFERRED EMBODIMENTS

A description will now be given of basic principles of the preferred embodiments of the present invention with reference to the accompanying drawings.

Figure 2:
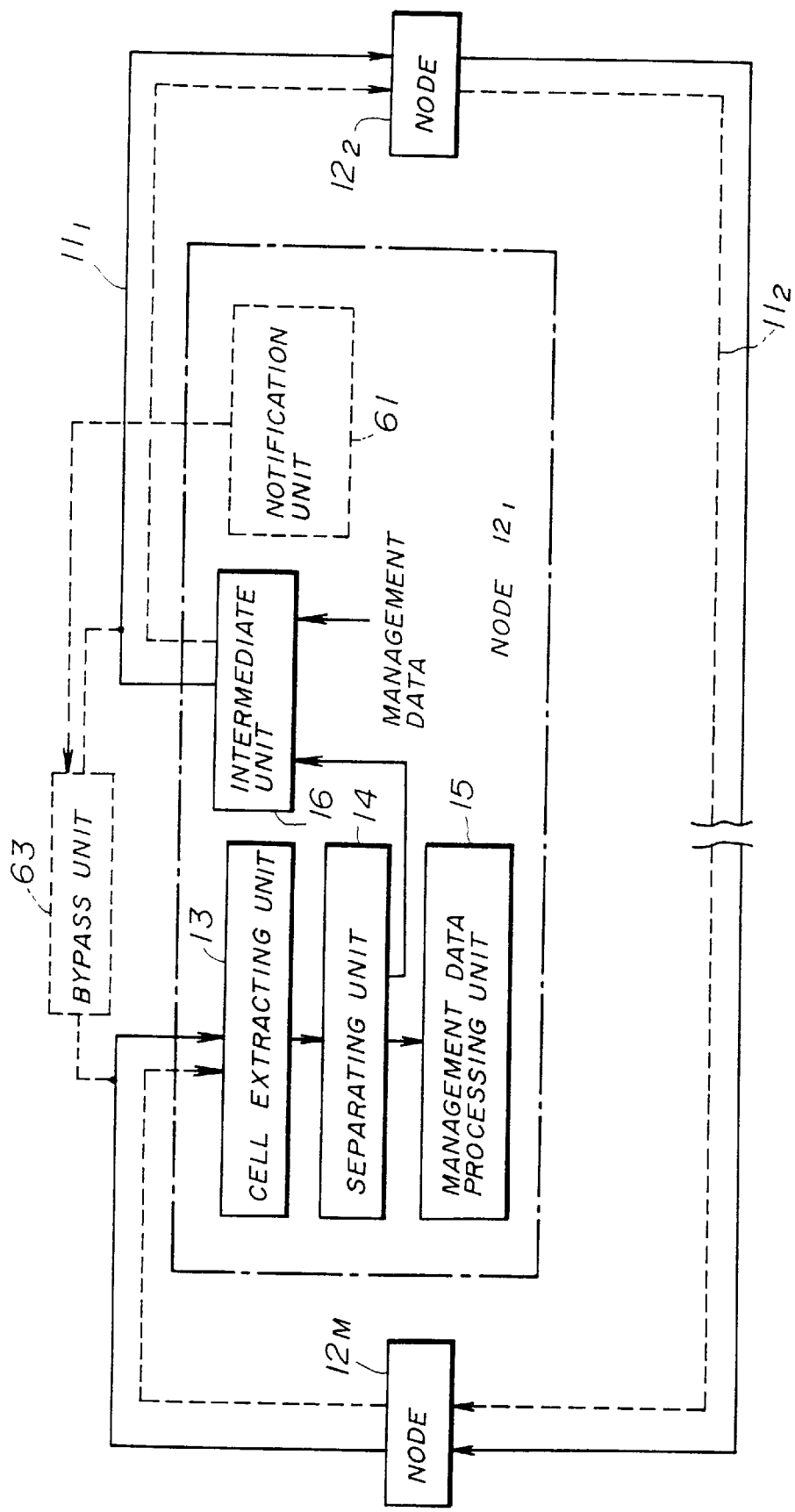
FIG. 2 is a block diagram showing the basic principle of a first embodiment of the present invention.

FIG. 2 shows the basic principle of a first embodiment of the present invention.

Referring to FIG. 2, a ring transmission system includes nodes $12_1$ through $12_M$ connected in a ring shape by transmission lines $11_1$ and $11_2$ to communicate with one another, each of the nodes providing a communication interface as one of a source node, a destination node and an intermediate node when a cell from the source node is transmitted to the destination node via the intermediate node on the transmission lines $11_1$ and $11_2$.

The transmission lines 11 of the ring transmission system have a redundant structure. One of the transmission lines $11_1$ and $11_2$ are primary transmission lines and the other are secondary transmission lines or bypass transmission lines, which provide the redundant structure of the transmission lines 11 for the ring transmission system.

Each of the nodes $12_1$ through $12_M$ comprises a cell extracting unit 13, a separating unit 14, a management data processing unit 15, and an intermediate unit 16. In the following, only the elements of the node $12_1$ will be described and shown in FIG. 2. Other nodes $12_2$ through $12_M$ are the same as the node $12_1$, and a description thereof will be omitted for the sake of convenience.

The cell extracting unit 13 of the node $12_1$ receives the cell from an input line of the transmission lines $11_1$ through $11_2$ and separates a control field from the cell in accordance with a communication control procedure used by the transmission lines $11_1$ and $11_2$. The control field includes a number of bits, separatable from message data included in the cell, which contain management data and a destination, the management data indicating information related to maintenance and operation of the ring transmission system.

The separating unit 14 separates, from the control field from the cell extracting unit 13, one of management data for the node $12_1$ and management data for another node by comparing the destination of the cell with an identification of the node $12_1$.

The management data processing unit 15 generates processed management data from the management data for the node $12_1$ supplied by the separating unit 14 when the destination of the cell indicates that the management data is for the node $12_1$.

The intermediate unit 16 generates a new cell containing the management data for the another node supplied by the separating unit 14 when the destination of the cell indicates that the management data is for the another node. The management data of the new cell is generated so as to be distinctly different from the processed management data generated by the management data processing unit 15. The intermediate unit 16 transmits the new cell to an output line of the transmission lines $11_1$ and $11_2$ for subsequent nodes on the transmission lines 11.

The cell which includes the management data and the message data is efficiently transmitted on the transmission lines in the present embodiment. The load required to process the cell at each node is dispersed to the intermediate unit and the management data processing unit of the present embodiment. It is possible for the ring transmission system of the present embodiment to provide an efficient transmission of the management data regardless of whether the quantity of traffic on the transmission lines is great or small.

Further, in the ring transmission system shown in FIG. 2, the node $12_1$ includes a notification unit 61 and a bypass unit 63.

The notification unit 61 monitors an operation of the node $12_1$ and generates a notification of starting of the operation of the node $12_1$.

The bypass unit 63 includes a relay which interconnects an input line of the transmission lines 11 on which a preceding adjacent node $12_M$ is located and an output line of the transmission lines 11 on which a following adjacent node $12_2$ is located. The relay of the bypass unit 63 is turned ON when the notification is generated by the notification unit 61.

Accordingly, even when the ring transmission system includes a node which is not connected to the transmission lines or does not start an operation, it is possible for the present embodiment to provide the bypass transmission lines between the input line and output line of the transmission lines of the node without causing a difficulty in the maintenance and operation of the system.

Figure 3:
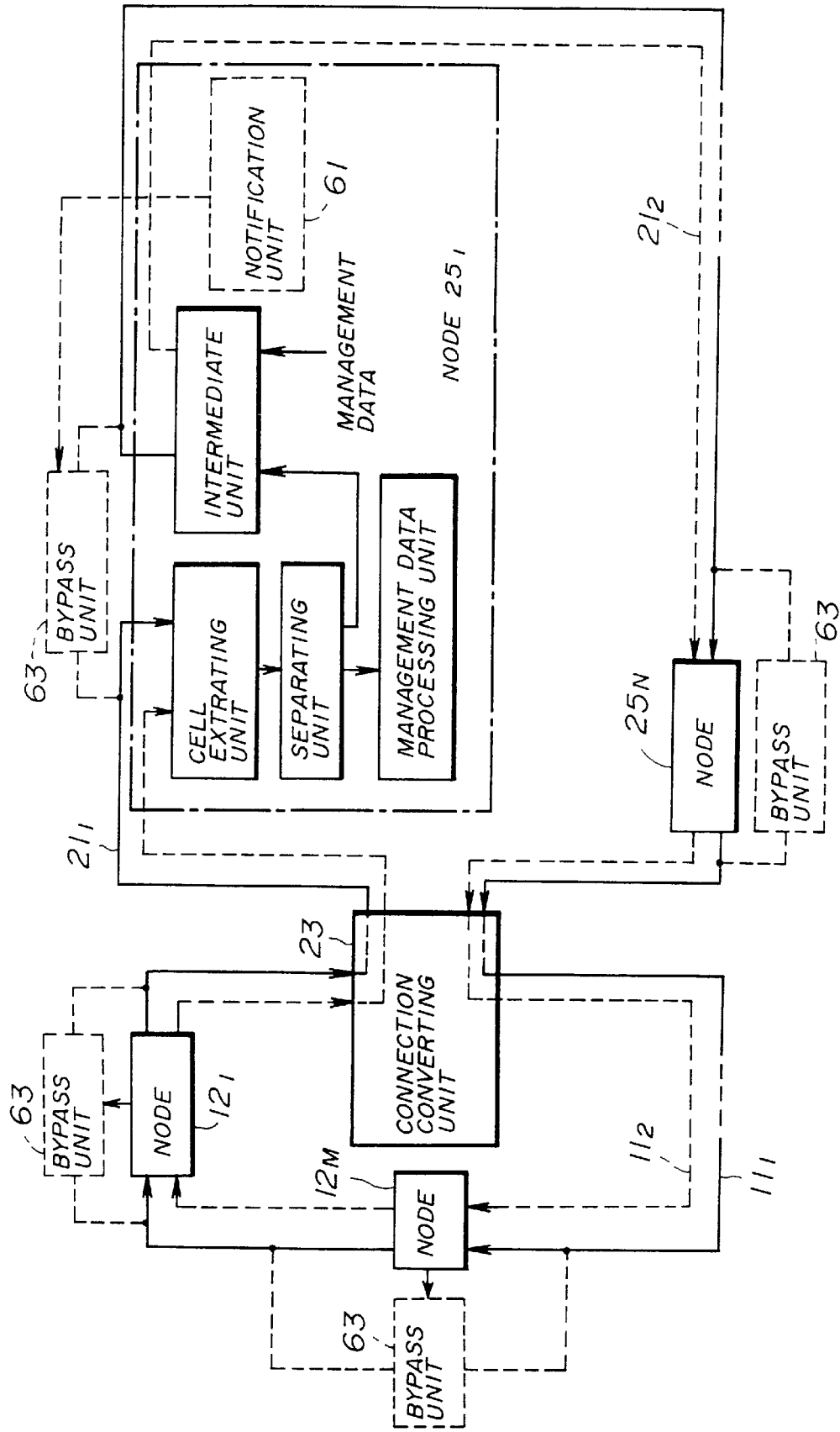
FIG. 3 is a block diagram showing the basic principle of a second embodiment of the present invention.

FIG. 3 shows the basic principle of a second embodiment of the present invention. In FIG. 3, the elements of the ring transmission system which are the same as corresponding elements in FIG. 2 are designated by the same reference numerals, and a description thereof will be omitted.

Referring to FIG. 3, the ring transmission system of the present embodiment includes secondary transmission lines $21_1$ and $21_2$, a connection converting unit 23, and secondary nodes $25_1$ through $25_N$ in addition to the elements of the previous embodiment.

The secondary transmission lines $21_1$ and $21_2$ are connected to the transmission lines 11 in a closed loop and use a communication control procedure which is the same as the communication control procedure of the transmission lines 11.

The connection converting unit 23 is provided on the transmission lines 11 and connects the transmission lines 11 to the secondary transmission lines $21_1$ and $21_2$ to allow extension of the transmission lines 11.

The secondary nodes $25_1$ through $25_N$ are connected in a ring shape by the secondary transmission lines $21_1$ and $21_2$, the secondary nodes $25_1$ through $25_N$ on the secondary transmission lines 21 and $21_2$ being the same as the nodes $12_1$ through $12_M$ on the transmission lines 11.

It is possible for the ring transmission system of the present embodiment to provide an efficient transmission of the management data from the source node to the destination node even when the construction of the nodes and the transmission lines in the system is modified in various ways.

Figure 4:
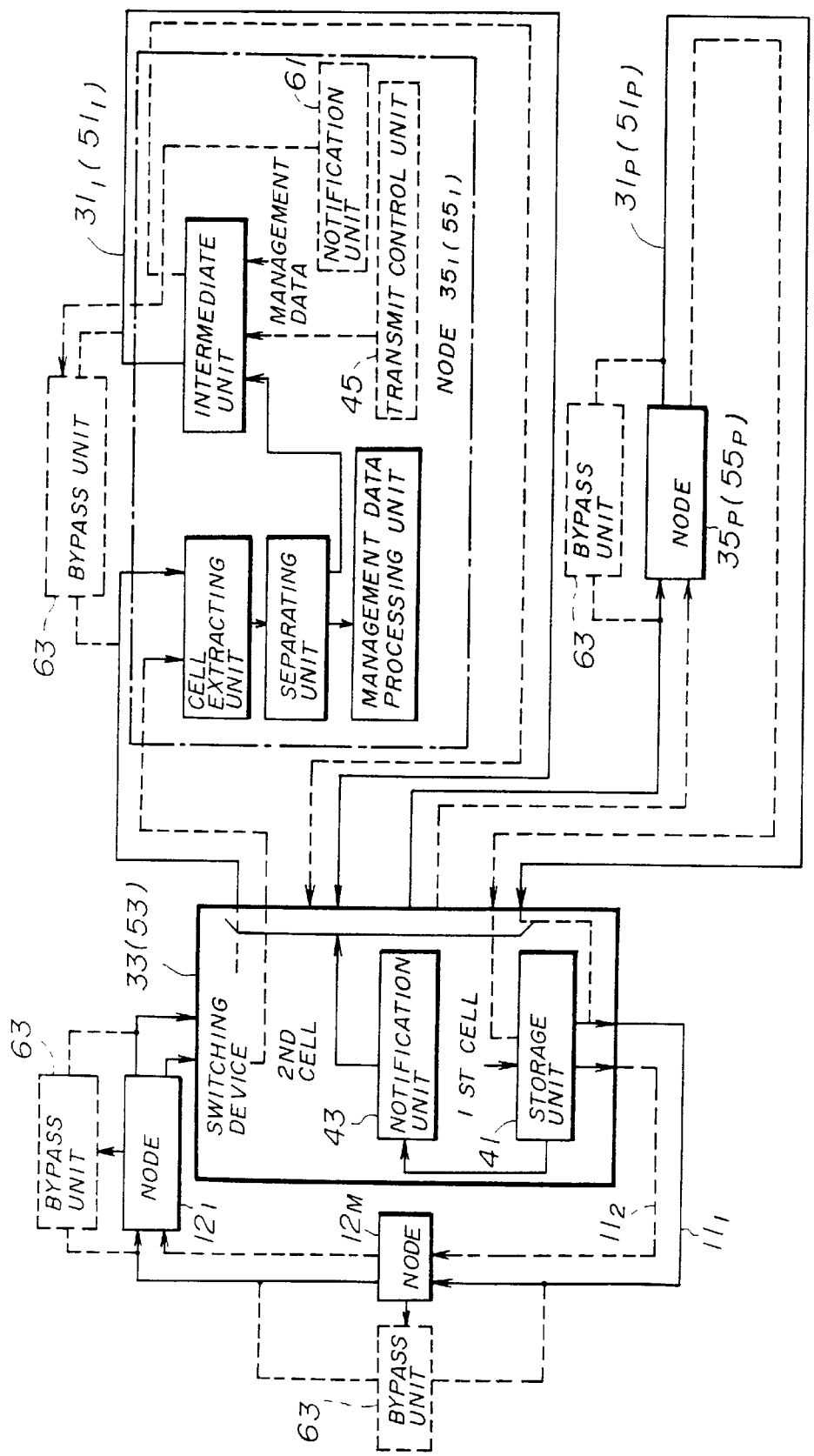
FIG. 4 is a block diagram showing the basic principle of a third embodiment of the present invention.

FIG. 4 shows the basic principle of a third embodiment of the present invention. In FIG. 4, the elements which are the same as corresponding elements in FIG. 3 are designated by the same reference numerals, and a description thereof will be omitted.

Referring to FIG. 4, the ring transmission system of the present embodiment includes a plurality of groups $31_1$ through $31_p$ of sub-transmission lines, secondary nodes $35_1$ through $35_p$, and a switching device 33 in addition to the elements of the previous embodiment in FIG. 2.

The groups $31_1$ through $31_p$ of sub-transmission lines are respectively connected to the transmission lines 11 in a closed loop and use a communication control procedure which is the same as the communication control procedure of the transmission lines 11.

The secondary nodes $35_1$ through $35_p$ are individually connected in a ring shape by one of the groups $31_1$ through $31_p$ of sub-transmission lines, the secondary nodes $35_1$ through $35_p$ on the groups $31_1$ through $31_p$ of sub-transmission lines being the same as the nodes 12 on the transmission lines 11.

The switching device 33 is provided on the transmission lines 11 and selectively connects the transmission lines 11 to one of the groups $31_1$ through $31_p$ of sub-transmission lines. The switching device 33 selects the one of the groups $31_1$ through $31_p$ to which the transmission lines 11 are connected when the cell is transmitted to one of the secondary nodes $35_1$ through $35_p$ on the one of the groups $31_1$ through $31_p$ of sub-transmission lines.

It is possible for the ring transmission system of the present embodiment to provide an efficient transmission of the management data from the source node to the destination node even when the construction of the nodes and the transmission lines in the system is modified in various ways.

Further, in the ring transmission system shown in FIG. 4, the switching device 33 includes a storage unit 41 and a notification unit 43, and each of the secondary nodes $35_1$ through $35_p$ includes a transmit control unit 45.

The storage unit 41 of the switching device 33 stores a first cell being transmitted to the transmission lines 11 for the nodes $12_1$ through $12_M$.

The notification unit 43 generates a second cell including management data which indicates a quantity of data of the first cell stored in the storage unit 41, and transmits the second cell to one of the groups $31_1$ through $31_p$ of sub-transmission lines for the secondary nodes $35_1$ through $35_p$.

The transmit control unit 45 of each secondary node monitors the second cell transmitted by the notification unit 43 and defers or cancels one of the transmission of a cell whose destination is one of the nodes $12_1$ through $12_p$ and the transmission of a cell whose destination is one of the secondary nodes $35_1$ through $35_p$ when the quantity of data indicated by the management data of the second cell is above a predetermined threshold value.

Further, in the ring transmission system of the present embodiment in FIG. 4, the cell includes a binary flag indicating one of intermediate transmission and selective connection with respect to a type of the transmission of the cell.

The ring transmission system of this embodiment includes a plurality of groups $51_1$ through $51_p$ of sub-transmission lines, secondary nodes $55_1$ through $55_p$, and a switching device 53, in addition to the elements of the previous embodiment in FIG. 2.

The groups $51_1$ through $51_p$ of sub-transmission lines are respectively connected to the transmission lines 11 in a closed loop and use a communication control procedure which is the same as the communication control procedure of the transmission lines 11.

The secondary nodes $55_1$ through $55_p$ are individually connected in a ring shape by one of the groups $51_1$ through $51_p$ of sub-transmission lines. The secondary nodes $55_1$ through $55_p$ on the groups $51_1$ through $51_p$ of sub-transmission lines are the same as the nodes $12_1$ through $12_M$ on the transmission lines 11.

The switching device 53 is provided on the transmission lines 11 and selectively connects the transmission lines 11 to one of the groups $51_1$ through $51_p$ of sub-transmission lines, the switching device 53 performing one of the intermediate transmission and the selective connection in accordance with a logical value of the binary flag included in the cell.

When the intermediate transmission is performed by the switching device 53, the cell from a preceding adjacent node is transmitted to a following adjacent node via the switching device 53.

When the selective connection is performed by the switching device 53, the transmission lines 11 are connected to the one of the groups $51_1$ through $51_p$ and the cell is transmitted from the switching device 53 to one of the secondary nodes $55_1$ through $55_p$ on the one of the groups $51_1$ through $51_p$ of sub-transmission lines.

Since the logical value of the binary flag of the cell can be determined or freely modified by any of the nodes serving as one of the source node and the intermediate node, it is possible for the present embodiment to determine or freely modify a communication path from the source node to the destination node on the transmission lines in accordance with the relative locations of the nodes, the total number of the nodes, and the occurrence of a failure of the transmission lines.

Figure 5:
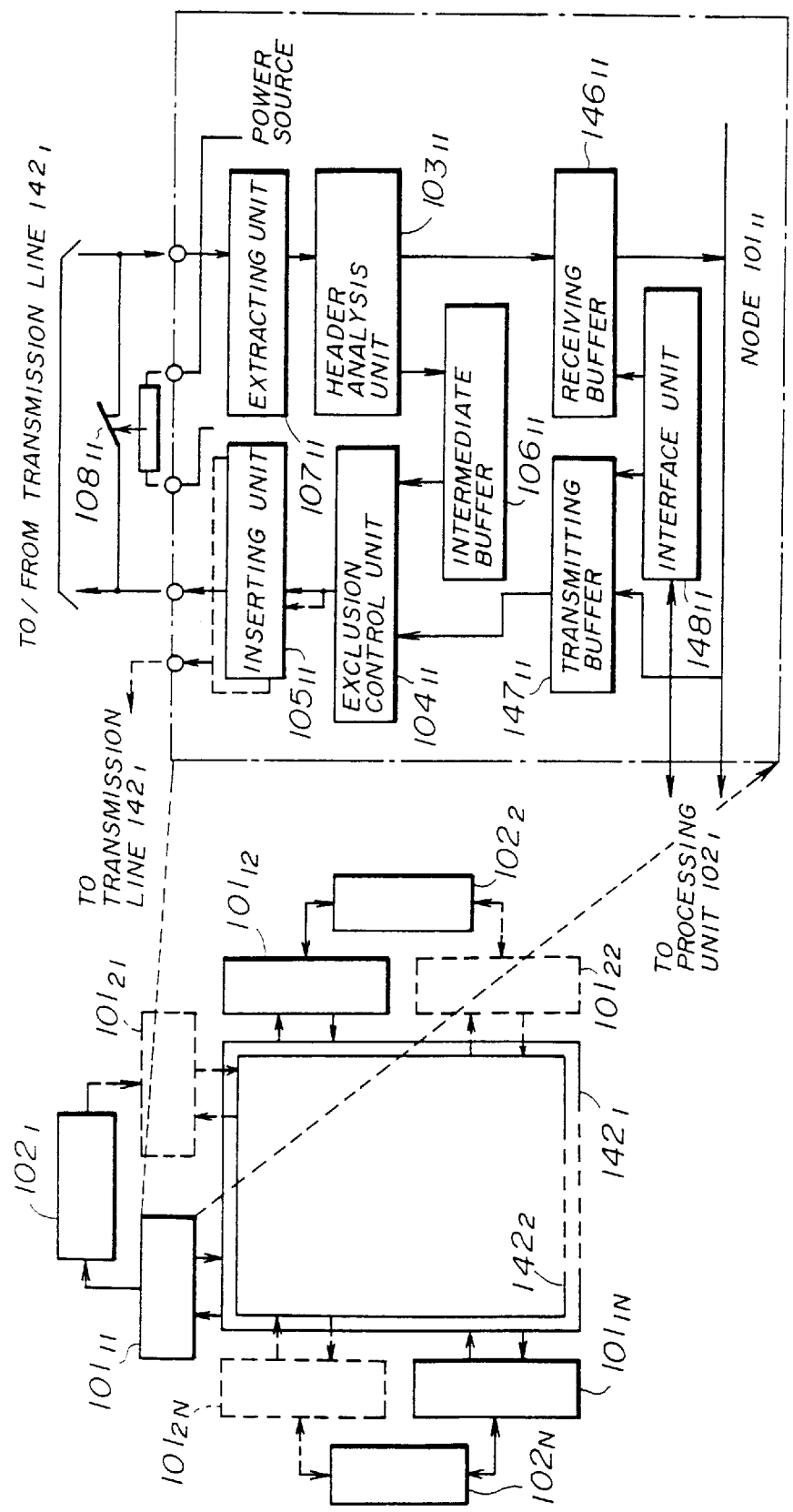
FIG. 5 is a block diagram of a ring transmission system in the first embodiment of the present invention.

FIG. 5 shows a ring transmission system in the first embodiment of the present invention. In FIG. 5, the elements of the ring transmission system which are the same as corresponding elements in FIG. 1 are designated by the same reference numerals, and a description thereof will be omitted.

Referring to FIG. 5, the ring transmission system includes nodes $101_{11}$ through $101_{1N}$ and nodes $101_{21}$ through $101_{2N}$, instead of the nodes $141_{11}$ through $141_{1N}$ and the nodes $141_{21}$ through $141_{2N}$, respectively. The ring transmission system includes processing units $102_1$ through $102_N$, instead of the processing units $143_1$ through $143_N$.

Figure 1:
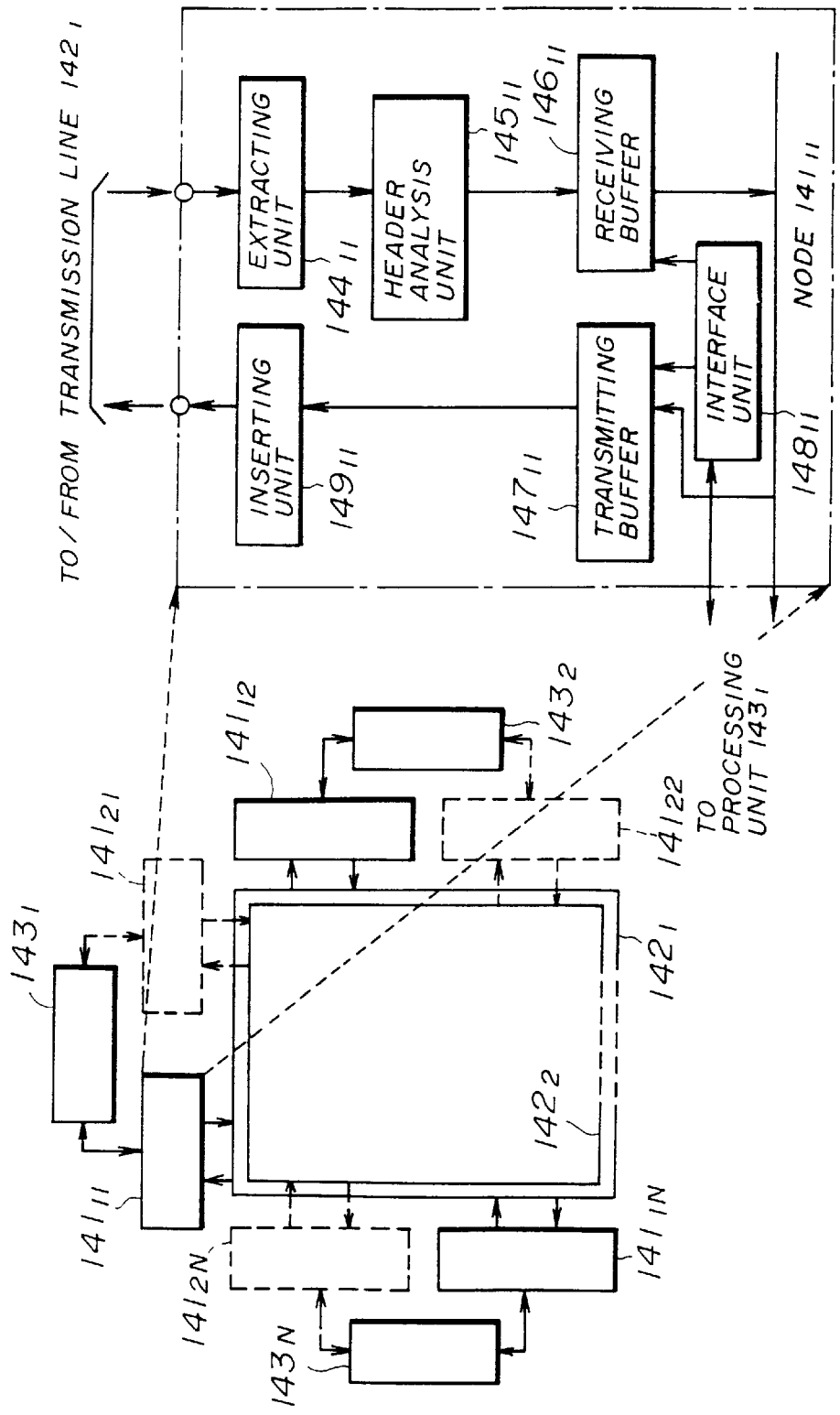
FIG. 1 is a block diagram of a conventional ring transmission system.

Differences between the node $101_{11}$ in FIG. 5 and the node $141_{11}$ in FIG. 1 are as follows.

As shown in FIG. 5, the node $101_{11}$ includes a header analysis unit $103_{11}$ instead of the header analysis unit $145_{11}$. The node $101_{11}$ includes an extracting unit $107_{11}$ instead of the extracting unit $144_{11}$, and an inserting unit $105_{11}$ instead of the inserting unit $149_{11}$. The node $101_{11}$ includes an exclusion control unit $104_{11}$ and an intermediate buffer $106_{11}$ which are not included in the node $141_{11}$.

The node $101_{11}$ in FIG. 5 further includes a relay $108_{11}$ which interconnects an input line of the transmission lines 142 on which a preceding adjacent node is located and an output line of the transmission lines 142 on which a following adjacent node is located. The relay $108_{11}$ is turned ON when a notification of a start of operation of the node $101_{11}$ is generated.

In the node $101_{11}$, an output of the header analysis unit $103_{11}$ is connected to the input of the receiving buffer $146_{11}$. The output of the transmitting buffer $147_{11}$ is connected to an input of the exclusion control unit $104_{11}$. An output of the exclusion control unit $104_{11}$ is connected to an input of the inserting unit $105_{11}$. Another output of the header analysis unit $103_{11}$ is connected to an input of the intermediate buffer $106_{11}$, and an output of the intermediate buffer $106_{11}$ is connected to another input of the exclusion control unit $104_{11}$. The nodes $101_{12}$ through $101_{1N}$ and the nodes $101_{21}$ through $101_{2N}$ on the ring transmission system in FIG. 5 are the same as the above node $101_{11}$, and a description thereof will be omitted.

The first transmission lines $142_1$ of the present embodiment in FIG. 5 correspond to the first transmission lines $11_1$ of the previous embodiments in FIGS. 2 through 4. Similarly, the nodes $101_{11}$ through $101_{1N}$ (or the nodes $101_{21}$ through $101_{2N}$) correspond to the nodes $12_1$ through $12_M$. The extracting unit 107 corresponds to the cell extracting unit 13. The header analysis unit 103 corresponds to the separating unit 14. The receiving buffer 146 and the processing unit 102 correspond to the management data processing unit 15. The intermediate buffer 106 and the exclusion control unit 104 correspond to the intermediate unit 16 and the notification unit 61. The relay 108 corresponds to the bypass unit 63.

Next, an operation of the ring transmission system of the first embodiment will be described with reference to FIG. 5.

The operation in the present embodiment is performed by the software of the processing unit $102_1$ in association with the header analysis unit 103. In the following description, the subscript of the reference numeral of each element which is the same as that of the node $101_{11}$ will be omitted for the sake of convenience.

The management data (including the destination) stored in the transmitting buffer 147 by the processing unit $102_1$ is sent to the exclusion control unit 104 when no management data is stored in the intermediate buffer 106. The exclusion control unit 104 converts the management data into a number of data units having a given length so as to generate a cell. The inserting unit 105 transmits the cell from the exclusion control unit 104 to an output line of the transmission lines $142_1$.

The extracting unit 107 receives a cell from an input line of the transmission lines $142_1$ and separates a control field from the received cell in accordance with a communication control procedure used by the transmission lines $142_1$. The control field includes a number of bits, separatable from message data included in the cell, which contains management data and a destination, the management data indicating information related to maintenance and operation of the ring transmission system.

The header analysis unit 103 separates, from the control field from the extracting unit 107, one of management data for the node $101_{11}$ and management data for another node by comparing the destination of the cell with an identification of the node $101_{11}$. When the destination indicates that the management data is for the node $101_{11}$, the header analysis unit 103 sends the management data to the receiving buffer 146. When the destination indicates that the management data is for another node, the header analysis unit 103 sends the management data to the intermediate buffer 106.

The processing unit $102_1$ generates processed management data from the management data for the node $101_{11}$ which is supplied from the header analysis unit 103 and stored in the receiving buffer 146. The intermediate buffer 106 stores the management data for the another node, supplied from the header analysis unit 103, and sends the same to the exclusion control unit 104 in a first-in first-out method under the control of the processing unit $102_1$.

The exclusion control unit 104 suitably selects one of the management data from the transmitting buffer 147 and the management data from the intermediate buffer 106 and converts the selected management data into a number of data units having a given length so as to generate a cell. The cell from the exclusion control unit 104 is sent to the inserting unit 105 so that the cell is transmitted by the inserting unit 105 to the transmission lines $142_1$.

The operation in the present embodiment which is related to the intermediate transmission is performed by the header analysis unit 103 in association with the intermediate buffer 106. The other operation in the present embodiment which is not related to the intermediate transmission is performed by the processing unit $102_1$ in association with the receiving buffer 146, the transmitting buffer 147 and the interface unit 148.

The load required to process the cell at each node is dispersed to the header analysis unit (which is associated with the intermediate buffer) and the processing unit (which is associated with the transmitting buffer and the receiving buffer). It is possible for the ring transmission system of the present embodiment to provide an efficient transmission of the management data regardless of whether the quantity of traffic on the transmission lines is great or small.

In the above description of the present embodiment, how the processing unit $102_1$ starts performing related processes for the transmission and the receiving of the cell and how the processing unit $102_1$ acquires the signal to start performing the related processes are not described. For example, a time the transmission of each cell including the management data, stored in the transmitting buffer $147_{11}$, is completed may be used for the processing unit $102_1$ to start the related processes, and a time each cell to which the management data is attached is written to the receiving buffer $146_{11}$ may be used for the processing unit $102_1$ to acquire the signal to start the performance of the related processes. The inserting unit $105_{11}$ or the header analysis unit $103_{11}$ at the time sends an interrupt signal to the processing unit $102_1$.

Figure 6:
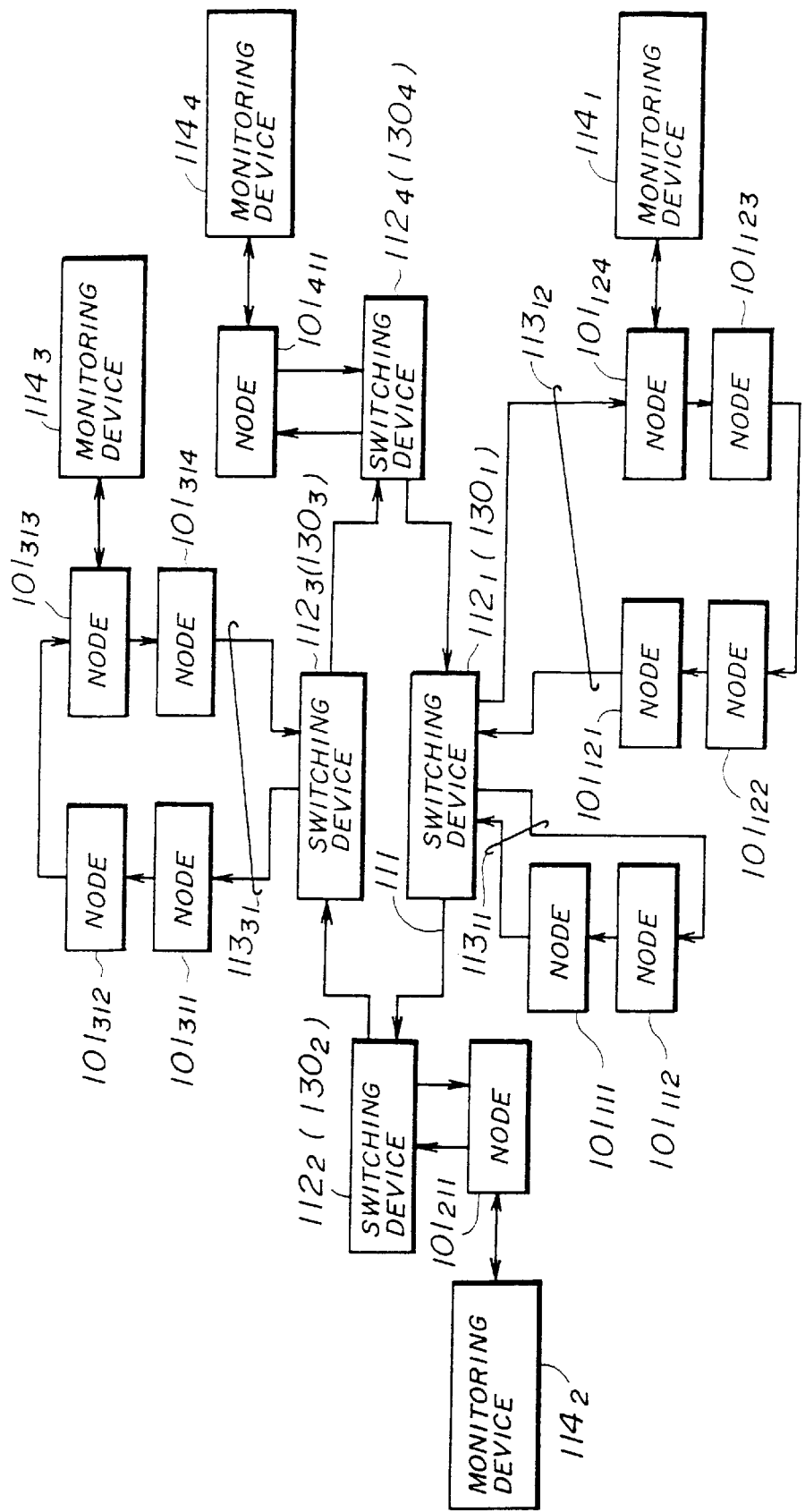
FIG. 6 is a block diagram of a ring transmission system in the second embodiment of the present invention.

FIG. 6 shows a ring transmission system in the second embodiment of the present invention. In FIG. 6, the elements which are the same as corresponding elements in FIG. 5 are designated by the same reference numerals, and a description thereof will be omitted.

Referring to FIG. 6, the ring transmission system includes switching devices $112_1$ through $112_4$ connected in series on primary transmission lines 111. The switching devices $112_1$ through $112_4$ are connected in a ring shape by the primary transmission lines 111. Each of the switching devices $112_1$ through $112_4$ corresponds to the connection converting unit 23 in FIG. 3.

Secondary transmission lines $113_{11}$, $133_{12}$ and $113_{31}$ are connected to the primary transmission lines 111 in a closed loop and use a communication control procedure which is the same as the communication control procedure of the primary transmission lines 111.

Each of the switching devices $112_1$ through $112_4$ connects the primary transmission lines 111 to the secondary transmission lines $113_{11}$ through $113_{31}$ to allow extension of the primary transmission lines 111.

The secondary transmission lines $113_{11}$ are connected to first trunk lines of the switching device $112_1$, and secondary nodes $101_{111}$ and $101_{112}$ are connected in a ring shape by the secondary transmission lines $113_{11}$. The secondary transmission lines $113_{12}$ are connected to second trunk lines of the switching device $112_1$, and secondary nodes $101_{121}$ through $101_{124}$ are connected in a ring shape by the secondary transmission lines $113_{12}$.

A node $101_{211}$ and a node $101_{411}$ are respectively connected to trunk lines of the switching device $112_2$ and trunk lines of the switching device $112_4$. The secondary transmission lines $113_{31}$ are connected to trunk lines of the switching device $112_3$, and secondary nodes $101_{311}$ through $101_{314}$ are connected in a ring shape by the secondary transmission lines $113_{31}$. Monitoring devices $114_1$, $114_2$, $114_3$, and $114_4$ are respectively connected to the nodes $101_{124}$, $101_{211}$, $101_{313}$, and $101_{411}$.

Figure 7:
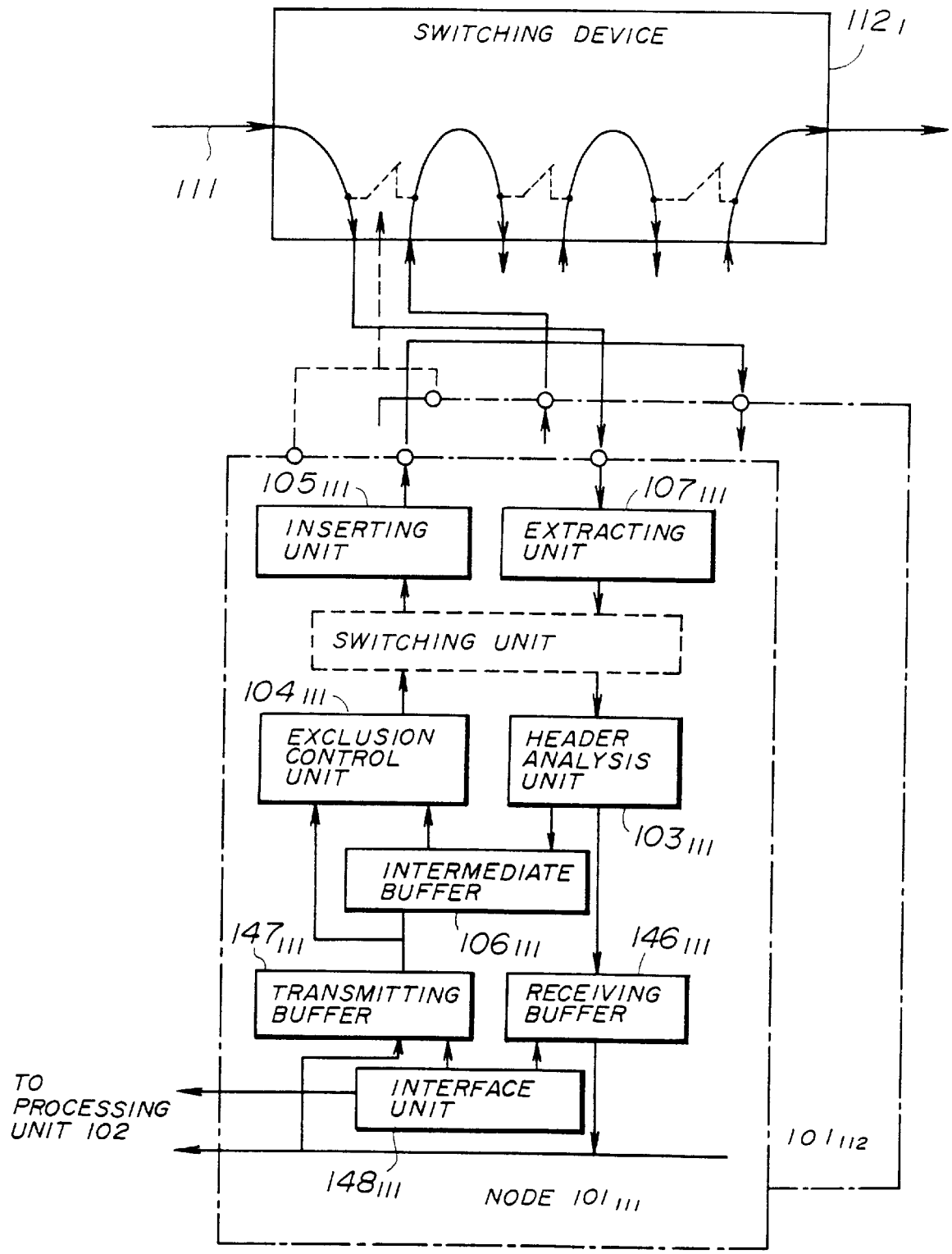
FIG. 7 is a block diagram of a node of the ring transmission system in FIG. 6.

FIG. 7 shows a node of the ring transmission system in FIG. 6.

Referring to FIG. 7, the switching device $112_1$ includes the first trunk lines having a down-terminal which is connected to the input of the extracting unit $107_{111}$ of the node $101_{111}$. The output of the inserting unit $105_{111}$ of the node $101_{111}$ is connected to the input of the extracting unit $107_{112}$ of the adjacent node $101_{112}$. The output of the inserting unit $105_{112}$ of the adjacent node $101_{112}$ is connected to an up-terminal of the first trunk lines of the switching device $112_1$.

The construction and operations of the elements of each of the nodes $101_{111}$ and $101_{112}$ are the same as those of the corresponding elements of the node $101_{11}$ of the previous embodiment in FIG. 5, and a description thereof will be omitted.

The primary transmission lines 111 of the present embodiment in FIGS. 6 and 7 correspond to the transmission lines 11 in FIGS. 2 through 4. Similarly, the secondary transmission lines 113 correspond to the secondary transmission lines 21. Each of the switching devices 112 corresponds to the connection converting unit 23. The secondary nodes 101 correspond to the secondary nodes 25.

Next, an operation of the ring transmission system of the present embodiment will be described with reference to FIGS. 6 and 7.

As shown in FIGS. 6 and 7, the switching device $112_1$ is provided on the primary transmission lines 111 and connects the primary transmission lines 111 to the secondary transmission lines $113_{11}$ and $113_{12}$ to allow extension of the primary transmission lines 111. Similarly, the switching device $112_3$ is provided on the primary transmission lines 111 and connects the primary transmission lines 111 to the secondary transmission lines $113_{31}$ to allow extension of the primary transmission lines 111. The switching device $112_2$ and $112_4$ are provided on the primary transmission lines 111 and provide a communication interface with the node $101_{211}$ and the node $101_{411}$, respectively.

The secondary nodes $101_{111}$ and $101_{112}$, the secondary nodes $101_{121}$ through $101_{124}$, the secondary nodes $101_{211}$ and $101_{411}$, and the secondary nodes $101_{311}$ through $101_{314}$ have a specific destination indicating that the management data is for that node. For example, when the primary transmission lines 111 are installed within a local office area, the secondary nodes are located at various places in the local office area, such as buildings, rooms, floors, etc.

The operations of the elements of the secondary nodes mentioned above are the same as those of the corresponding elements of the nodes in FIG. 5, and a description thereof will be omitted.

It is possible for the ring transmission system of the present embodiment to provide an efficient transmission of the management data from the source node to the destination node even when the construction of the secondary nodes and the secondary transmission lines in the system is modified in various ways. It is not necessary to modify the basic construction and communication control method of the primary transmission lines 111.

Figure 8:
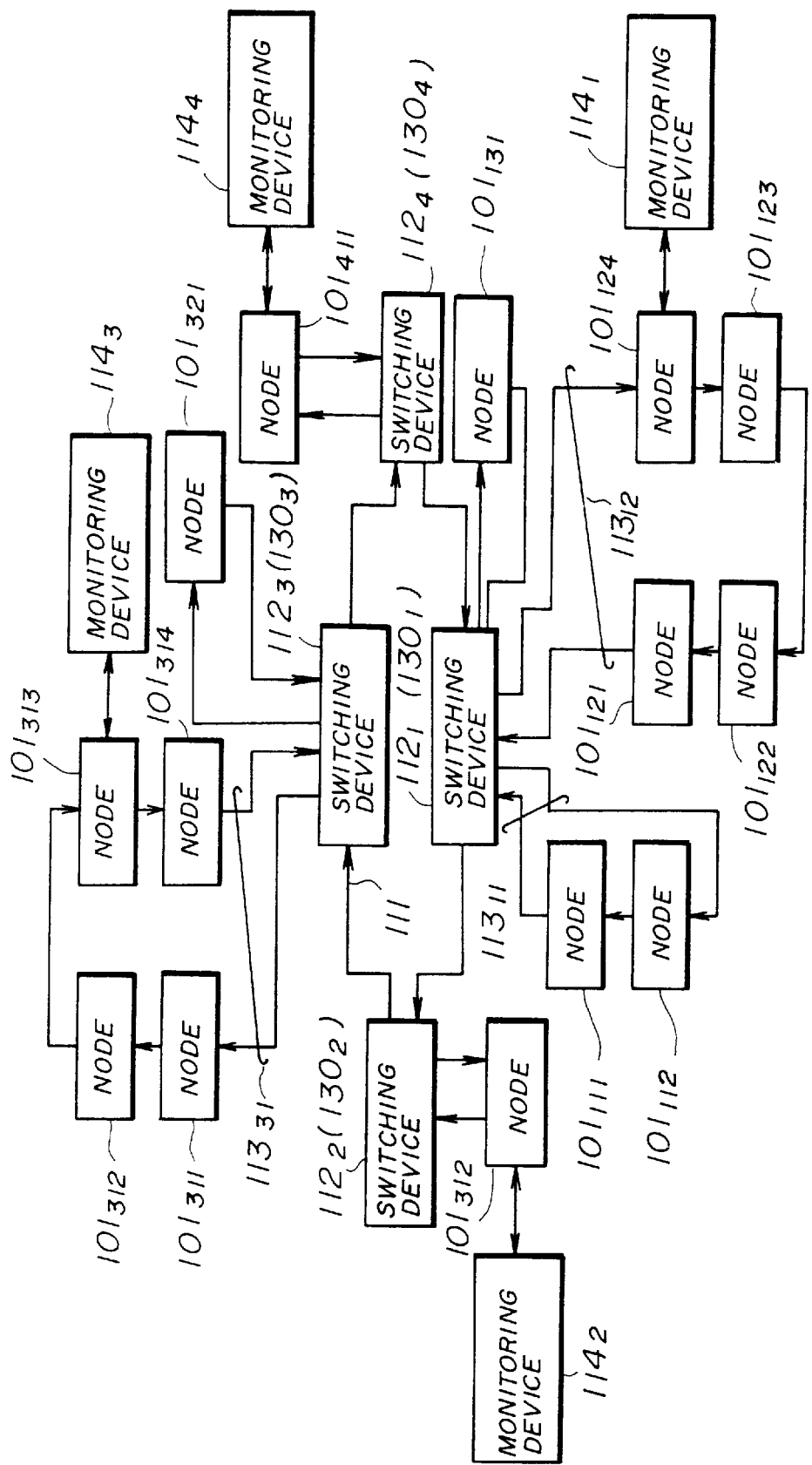
FIG. 8 is a block diagram of a ring transmission system in the third embodiment of the present invention.
Figure 9:
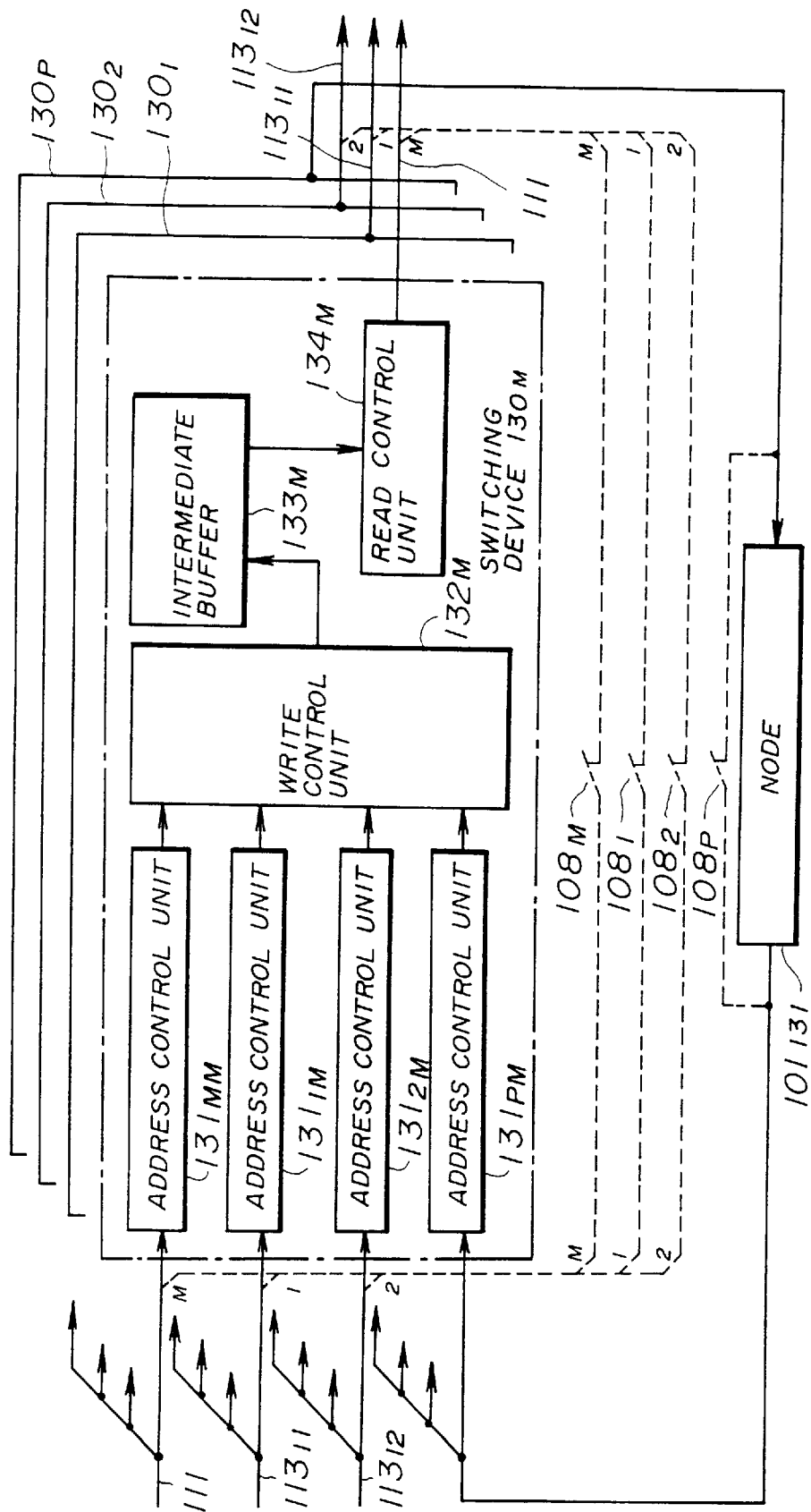
FIG. 9 is a block diagram of a separating unit of the ring transmission system in FIG. 8.

FIG. 8 shows a ring transmission system in the third embodiment of the present invention. FIG. 9 shows an operation of the ring transmission system in FIG. 8. In FIGS. 8 and 9, the elements which are the same as corresponding elements in FIGS. 6 and 7 are designated by the same reference numerals, and a description thereof will be omitted.

Differences in construction between the present embodiment in FIGS. 8 and 9 and the previous embodiment in FIGS. 6 and 7 are as follows. The ring transmission system of the present embodiment includes, as shown in FIG. 8, switching devices $130_1$ and $130_3$ on the primary transmission lines 111, instead of the switching devices $112_1$ and $112_3$ in FIG. 6. In addition, in the ring transmission system of the present embodiment, nodes $101_{131}$ and $101_{321}$ are connected directly to the switching devices $130_1$ and $130_3$, respectively.

In FIG. 9, a specific one of the switching devices $130_1$ through $130_p$ which is taken into account is designated by the reference numeral $130_M$, and the elements of the switching device $130_M$ are designated by the corresponding reference numerals with the subscript M.

As shown in FIG. 9, the switching device $130_M$ includes address control units $131_{MM}$, $131_{1M}$, $131_{2M}$ and $131_{PM}$, a write control unit $132_M$, an intermediate buffer $133_M$, and a read control unit $134_M$.

An output line of the primary transmission lines 111 is connected to an input of the address control unit $131_{MM}$. An output line of the secondary transmission lines $113_{11}$ is connected to an input of the address control unit $131_{1M}$. An output line of the secondary transmission lines $113_{12}$ is connected to an input of the address control unit $131_{2M}$. An output line of the node $101_{131}$ is connected to an input of the address control unit $131_{PM}$.

Outputs of the address control units $131_{MM}$ through $131_{PM}$ are connected to inputs of the write control unit $132_M$. An output of the write control unit $132_M$ is connected to an input of the intermediate buffer $133_M$. An output of the intermediate buffer $133_M$ is connected to an input of the read control unit $134_M$. An output of the read control unit $134_M$ is connected to an input line of the primary transmission lines 111.

The outputs of the intermediate buffers 133 of the switching devices $130_1$ through $130_P$ are connected to the input lines of the primary transmission lines 111, the secondary transmission lines $113_{11}$ and $113_{12}$ and the node $101_{131}$ via the read control units 134. That is, the output of the read control unit 134 of the switching device $130_1$ is connected to the input line of the secondary transmission lines $113_{11}$, the output of the read control unit 134 of the switching device $130_2$ is connected to the input line of the secondary transmission lines $113_{12}$, and the output of the read control unit 134 of the switching device $130_P$ is connected to the input line of the node $101_{131}$.

The other construction of the switching devices $130_1$, $130_2$ and $130_P$ is the same as that of the switching device $130_M$ described above, and a description thereof will be omitted.

The primary transmission lines 111 in the present embodiment in FIGS. 8 and 9 correspond to the transmission lines 11 in FIGS. 2, 3 and 4. Similarly, the secondary transmission lines 113 correspond to the secondary transmission lines 21, the switching devices 130 correspond to the switching devices 33 (or 53), and the nodes 101 correspond to the nodes 25.

Next, another operation of the ring transmission system of the present embodiment will be described with reference to FIGS. 8 and 9.

The operation in the present embodiment is performed by the address control units 131 of the switching devices 130.

The address control units $131_{MM}$ through $131_{MP}$, the address control units $131_{1M}$ through $131_{1P}$ and the address control units $131_{2M}$ through $131_{2P}$ of the switching devices $130_M$ through $130_P$ have all destination addresses which are uniquely allocated to all the nodes on the primary transmission lines 111 and the secondary transmission lines 113. The address control units $131_{PM}$ through $131_{PP}$ have a destination address which is allocated to the node $101_{131}$.

The address control units $131_{MM}$ through $131_{MP}$, $131_{1M}$ through $131_{1P}$, $131_{2M}$ through $131_{2P}$, and $131_{PM}$ through $131_{PP}$ receive all the cells from the nodes on the primary transmission lines 111 and the secondary transmission lines 113 and from the node $101_{131}$ and extract the destination from each cell. It is determined whether the destination of each cell is equal to one of the allocated destination addresses mentioned above.

When the destination of each cell is not equal to any of the allocated destination addresses, the address control units 131 delete the management data of the cell. When the destination of each cell is equal to one of the allocated destination addresses, the address control units 131 write the management data of the cell to the intermediate buffer 133 of the corresponding node by using the write control unit 132. The write control units $132_M$, $132_1$, $132_2$ and $132_P$ control the writing addresses of the intermediate buffers 133 respectively.

The read control units $134_M$, $134_1$, $134_2$ and $134_P$ control the reading addresses of the intermediate buffers 133 respectively. The management data of each cell stored in the intermediate buffer 133 of the corresponding node is sequentially read out and transmitted to one of the primary transmission lines 111, the secondary transmission lines 113 and the node $101_{131}$ by using the read control unit 134.

In the present embodiment, the switching devices 130 transmit each cell, which is received from the primary transmission lines 111, the secondary transmission lines 113 and the node $101_{131}$, to one of the destination node and the transmission lines on which the destination node is located, in accordance with the destination of the cell. The number of intermediate transmissions in the ring transmission system is remarkably reduced, and it is possible for the present embodiment to provide an efficient transmission of the management data from the source node to the destination node.

Next, still another operation of the ring transmission system of the present embodiment will be described with reference to FIGS. 8 and 9.

The read control units $134_1$, $134_2$ and $134_P$, as shown in FIG. 9, monitor a quantity of data of the cell stored in the intermediate buffer 133 at a predetermined frequency (or a predetermined period of time) and generate a cell including management data which indicates the quantity of data of the cell stored in the intermediate buffer 133. These read control units 134 transmit the cell including the management data to one of the groups of the secondary transmission lines 113 for the secondary nodes 101.

The processing units 102 (not shown) connected to the secondary nodes 101 monitor the cell transmitted by the read control units 134 of the switching devices 130, and defer or cancel one of the transmission of a cell whose destination is one of the nodes 101 (or the switching devices 130) on the primary transmission lines 111 and the transmission of a cell whose destination is one of the secondary nodes 101 on the one of the groups of the secondary transmission lines 113 when the quantity of data indicated by the management data of the received cell is above a threshold value.

In the present embodiment, the congestion of the primary transmission lines 111 can be reliably prevented. The maintenance and operation of the ring transmission system can be suitably performed, and it is possible to provide an efficient transmission of the management data.

Next, a further operation of the ring transmission system of the present embodiment will be described with reference to FIGS. 8 and 9.

The operation in the present embodiment is performed by the address control units $131_{MM}$ through $131_{MP}$, $131_{1M}$ through $131_{1P}$, $131_{2M}$ through $131_{2P}$, and $131_{PM}$ through $131_{PP}$ of the switching devices 130. For the sake of convenience, it is supposed that the ring transmission system of the present embodiment includes, as shown in FIGS. 8 and 9, the primary transmission lines 111, the secondary transmission lines $113_{11}$ and $113_{12}$, and the node $101_{131}$.

Figure 10:
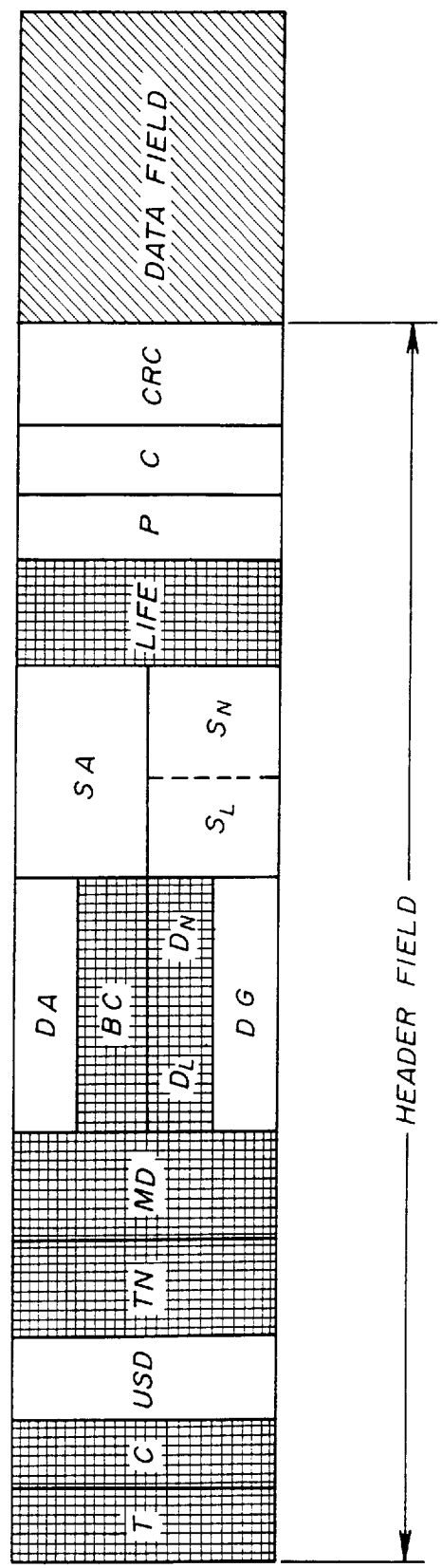
FIG. 10 is a diagram showing the format of a cell.

The cell, which is transmitted or received on the primary transmission lines 111 and the secondary transmission lines 113, includes the management data in the form shown in FIG. 10. A control field of the cell includes, as shown in FIG. 10, a route change flag MD in addition to the destination address DA. The route change flag MD is a binary flag which indicates one of the intermediate transmission of the management data and the selective connection of the switching device with respect to the type of the transmission of the cell.

When the cell including the management data (with the route change flag MD) is received, the address control units $131_{MM}$ through $131_{MP}$, $131_{1M}$ through $131_{1P}$, $131_{2M}$ through $131_{2P}$, and $131_{PM}$ through $131_{PP}$ of the switching devices 130 detect whether the logical value of the route change flag MD included in the received cell is equal to one.

When the result of the detection is affirmative (the route change flag MD is equal to one), the address control units 131 perform the selective connection to connect the primary transmission lines 111 to one of the groups $113_{11}$ and $113_{12}$ of the secondary transmission lines in accordance with the destination of the received cell. By this selective connection performed by the address control units 131, the management data of the received cell is not deleted regardless of which node of the ring transmission system is indicated by the destination of the received cell, but is stored in one of the intermediate buffers $133_M$, $133_1$, $133_2$ and $133_P$ of the switching devices 130.

On the other hand, when the result of the above detection is negative (the route change flag MD is equal to zero), the address control units 131 perform the intermediate transmission of the management data. The intermediate transmission performed by the address control units 131 at this time is the same as that performed in the previous embodiment. That is, the processing units 102 connected to the secondary nodes 101 defer or cancel one of the transmission of a cell whose destination is one of the nodes 101 (or the switching devices 130) on the primary transmission lines 111 and the transmission of a cell whose destination is one of the secondary nodes 101 on the one of the groups of the secondary transmission lines 113 when the quantity of data indicated by the management data of the received cell is above the threshold value.

Next, another operation of the ring transmission system of the present embodiment will be described with reference to FIGS. 5, 7 and 9.

As shown in FIGS. 5 and 9, the connections of the nodes $101_{11}$ through $101_{1N}$ and the transmission lines $142_1$ are connected to the secondary ends of the relays $108_{11}$ through $108_{1N}$. The connections of the nodes $101_{21}$ through $101_{2N}$ and the transmission lines $142_2$ are connected to the secondary ends of the relays $108_{21}$ through $108_{2N}$. The power source of each of the nodes $101_{11}$ through $101_{1N}$ is connected to the primary end of each of the relays $108_{11}$ through $108_{1N}$ to supply power thereto. The power source of each of the nodes $101_{21}$ through $101_{2N}$ is connected to the primary end of each of the relays $108_{21}$ through $108_{21}$ to supply power thereto.

In the present embodiment, when the node $101_{11}$, for example, is not connected to the transmission lines 142, the power from the power source is not supplied to the relay $108_{11}$. The relay $108_{11}$ at this time is turned OFF. When the node $101_{11}$ is connected to the transmission lines 142 but does not start operation, the node $101_{11}$ defers supplying the power from the power source to the relay $108_{11}$. The relay $108_{11}$ at this time is turned OFF.

On the other hand, when the node $101_{11}$ is connected to the transmission lines 142 and is normally operating, the power from the power source is supplied to the relay $108_{11}$. The relay $108_{11}$ at this time is turned ON to interconnect the transmission lines $142_1$ and the transmission lines $142_2$.

Accordingly, even when the ring transmission system includes a node which is not connected to the transmission lines or does not start operation, it is possible for the present embodiment to provide the bypass transmission lines between the input line and output line of the transmission lines of the node without causing a difficulty in the maintenance and operation of the system.

Figure 11:
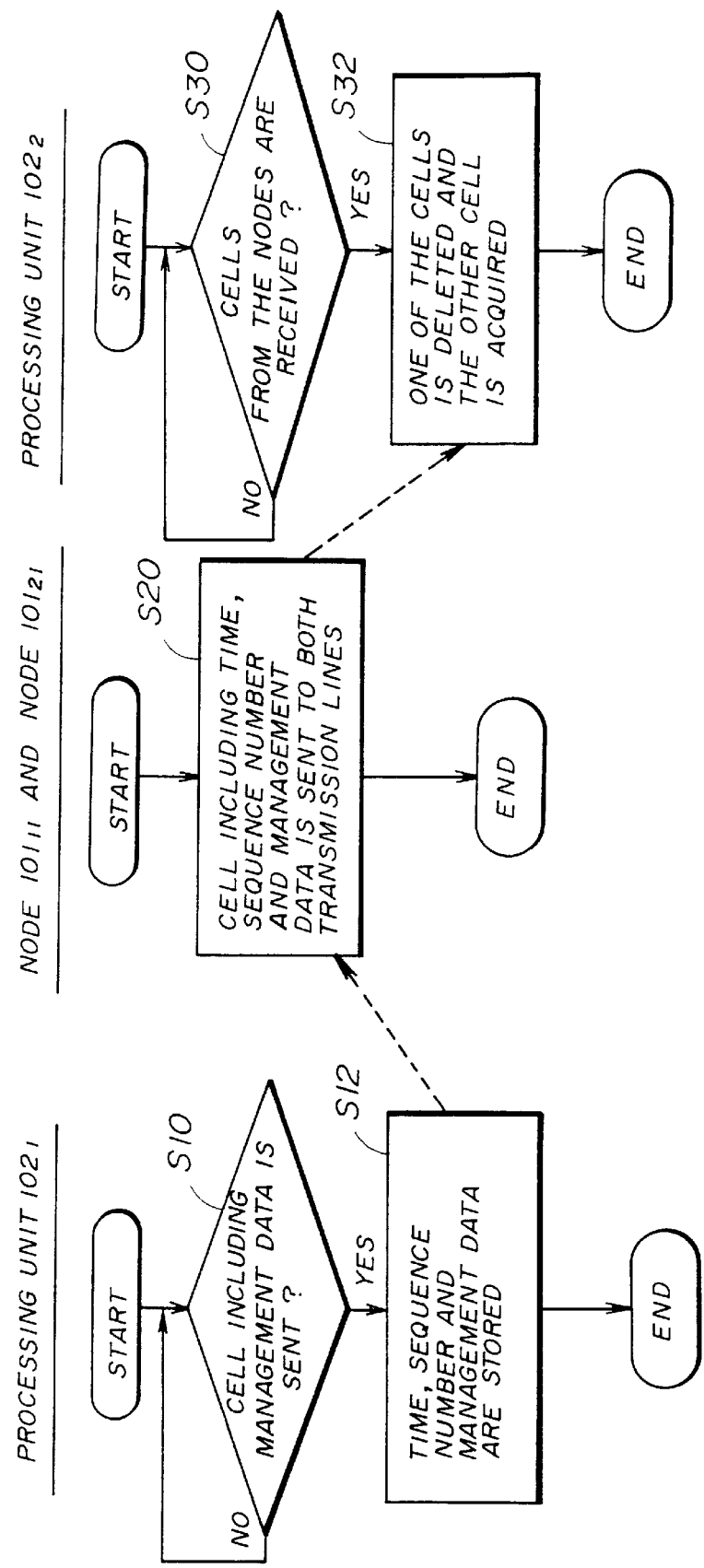
FIG. 11 is a flowchart for explaining an operation of a ring transmission system in a fourth embodiment of the present invention.

FIG. 10 shows the format of a cell used by the ring transmission system of the present invention. FIG. 11 shows an operation of a ring transmission system in a fourth embodiment of the present invention. Next, a description will be given of the operation of the present embodiment with reference to FIGS. 5, 10 and 11.

In the present embodiment, the operation shown in FIG. 11 is performed by the software of the processing units $102_1$ through $102_N$ in the ring transmission system. The construction of the hardware of the ring transmission system of the present embodiment is the same as that of the ring transmission system shown in FIG. 5, and a description thereof will be omitted.

In the present embodiment, a time stamp field T and a sequence counter field C are included in the management data of a cell which is transmitted or received by the nodes $101_{11}$ through $101_{1N}$ on the transmission lines $142_1$ and by the nodes $101_{21}$ through $101_{2N}$ on the transmission lines $142_2$. In the present embodiment, the header field of the cell includes the time stamp field T, the sequence counter field C in addition to the route change flag MD.

Referring to FIG. 11, the processing unit $102_1$ at step S10 detects whether a cell including management data is transmitted to one of the nodes $101_{12}$ through $101_{1N}$, the management data indicating information related to maintenance and operation of the system. When the result at the step S10 is affirmative (the cell including the management data is sent), step S12 is performed. When the result at the step S10 is negative, the procedure is transferred again to the step S10 at the following cycle.

At the step S12, the processing unit $102_1$ stores a time indicated by a clock (not shown) and a sequence number determined by a sequence controller (not shown) in the transmitting buffer $147_{11}$ in addition to the management data of the cell. The processing unit $102_1$ stores the time, the sequence number and the management data in the transmitting buffer $147_{21}$ in a parallel manner at the time of the transmission of the cell.

After the step S12 is performed by the processing unit $102_1$, the node $101_{11}$ and the node $101_{21}$ perform step S20. In the node $101_{11}$ and the node $101_{21}$, at the step S20, the inserting unit $105_{11}$ and the inserting unit $105_{21}$ transmit the cell including the time, the sequence number and the management data (as shown in FIG. 10) to the transmission lines $142_1$ and the transmission lines $142_2$, respectively, when the time, the sequence number and the management data, stored in the transmitting buffers $147_{11}$ and $147_{21}$, are sent to the inserting units via the exclusion control unit $104_{11}$ and the exclusion control unit $104_{21}$.

In the present embodiment, it is supposed that the node $101_{12}$ and the node $102_{22}$ respectively receive the above cell from the transmission lines $142_1$ and the transmission lines $142_2$, for the sake of convenience. The received cell is sent to the extracting unit 107, the header analysis unit 103 and the receiving buffer 146 (of both the node $101_{12}$ and the node $102_{22}$), and the cell from the node $101_{12}$ and the cell from the node $102_{22}$ are both sent to the processing unit $102_2$.

The processing unit $102_2$ at step S30 detects whether the cell from the source node is received. When the result at the step S30 is affirmative, step S32 is performed. When the result at the step S30 is negative, the procedure is transferred again to the step S30.

The processing unit $102_2$, at the step S32, deletes one of the two cells from the nodes $101_{12}$ and $101_{22}$ and acquires the other of them as a unified cell including the time T, the sequence number C and the management data when the two cells include the same time T and the same sequence number C in the header field.

Accordingly, it is possible that the present embodiment transmits and receives the management data of the cell between the nodes through the transmission lines $142_1$ and $142_2$ having a redundant structure with a high reliability by utilizing the software of the processing units. It is not necessary to modify the construction of the hardware of the network.

In the present embodiment, the transmission lines $142_1$ and $142_2$ have a redundant structure with the first transmission lines and the second transmission lines. However, the present invention is not limited to this embodiment. For example, the transmission lines having a triple or more multiple redundant structure may be included in the ring transmission system of the present invention.

Figure 12:
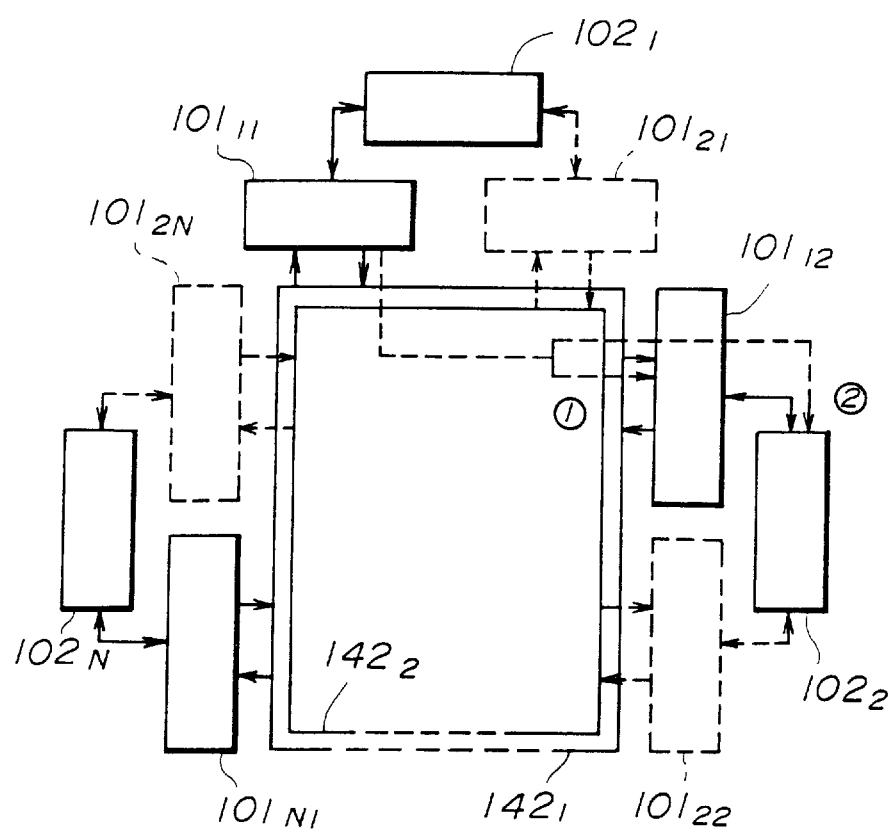
FIG. 12 is a diagram for explaining an operation of a ring transmission system in a fifth embodiment of the present invention.

FIG. 12 shows an operation of a ring transmission system in a fifth embodiment of the present invention.

In the present embodiment, the operation is performed by using the format of the cell shown in FIG. 10 and the intermediate buffers $106_{11}$ through $106_{1N}$ of the individual nodes of the ring transmission system. The construction of the hardware of the ring transmission system of the present embodiment is the same as that of the ring transmission system of the first embodiment in FIG. 5, and a description thereof will be omitted.

In the present embodiment, a deletion-node indication field TN is included in the management data of a cell which is transmitted or received by the nodes $101_{11}$ through $101_{1N}$ on the transmission lines $142_1$ and by the nodes $101_{21}$ through $101_{2N}$ on the transmission lines $142_2$. In the present embodiment, the header field of the cell, as shown in FIG. 10, includes the deletion-node indication field TN. The deletion-node indication TN indicates whether the cell is deleted by the node receiving the cell.

Referring to FIG. 12, the processing unit $102_1$, when transmitting a cell including management data to one of the nodes $101_{12}$ through $101_{1N}$ and the nodes $101_{22}$ through $101_{2N}$, determines the value (or the logical value) of the deletion node indication TN in accordance with the information related to the maintenance and operation of the ring transmission system. Further, the processing unit $102_1$ stores the management data with the deletion-node indication TN of the cell in the transmitting buffer $147_{11}$.

The management data, stored in the transmitting buffer $147_{11}$, is sent to the inserting unit $105_{11}$ via the exclusion control unit $104_{11}$. The inserting unit $105_{11}$ of the node $101_{11}$ transmits the cell including the management data (as shown in FIG. 10) to the output line of the transmission lines $142_1$ when the management data is received.

In the present embodiment, it is supposed that the node $101_{12}$ receives the above cell from the transmission lines $142_1$, for the sake of convenience. The received cell is sent to the extracting unit $107_{12}$, and it is sent to the header analysis unit $103_{12}$. The header analysis unit $103_{12}$ separates a header field from the received cell, and detects whether a destination address DA contained in the header field of the cell is equal to an identification of the node $101_{12}$.

When the destination address DA of the received cell is detected as being unequal to the identification of the node $101_{12}$, the header analysis unit $103_{12}$ separates the individual fields from the received cell and stores the cell including the management data in the intermediate buffer $106_{12}$.

When the destination address DA is detected as being equal to the identification of the node $101_{12}$, the header analysis unit $103_{12}$ separates the individual fields from the received cell and stores the cell including the management data in the receiving buffer $146_{12}$.

When the management data stored in the receiving buffer $146_{12}$ is sent to the processing unit $102_2$, the processing unit $102_2$ detects whether the value of the deletion-node indication TN is equal to one. When the value of the deletion-node indication TN is detected as being equal to one, the processing unit $102_2$ deletes the management data of the individual fields in the receiving buffer $146_{12}$.

When the management data stored in the intermediate buffer $106_{12}$ is sent to the processing unit $102_2$, the processing unit $102_2$ detects whether the value of the deletion-node indication TN is equal to zero. When the value of the deletion-node indication TN is detected as being equal to zero, the processing unit $102_2$ deletes the management data of the individual fields of the cell in the intermediate buffer $106_{12}$.

In the present embodiment, the deletion of the management data of the cell, which is transmitted or received between the nodes on the transmission lines $142_1$ and between the nodes the transmission lines $142_2$, is selectively performed by one of the source node and the destination node. Accordingly, it is possible that the present embodiment transmits and receives the management data of the cell in an appropriate manner for the maintenance and operation of the nodes and the transmission lines within the network.

In the present embodiment, the construction of the hardware of the ring transmission system of the present embodiment is the same as that of the ring transmission system of the first embodiment in FIG. 5. However, the present invention is not limited to this embodiment. The present embodiment in FIG. 12 is also applicable to other previous embodiments of the present invention.

Figure 13:
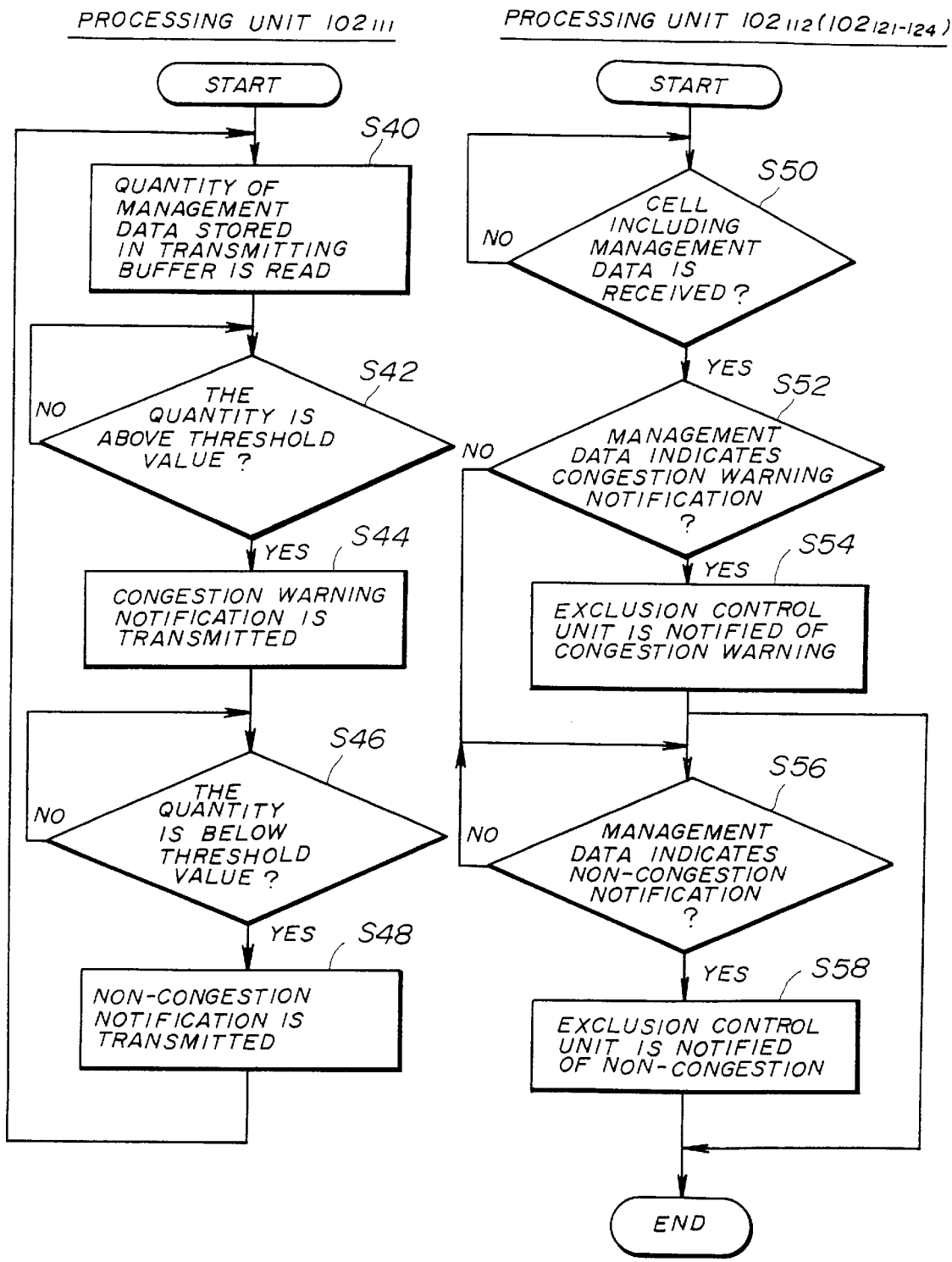
FIG. 13 is a flowchart for explaining an operation of a ring transmission system in a sixth embodiment of the present invention.

FIG. 13 shows an operation of a ring transmission system in a sixth embodiment of the present invention. Next, the operation of the ring transmission system of the present embodiment will be described with reference to FIGS. 6, 7 and 13.

In the present embodiment, the operation shown in FIG. 13 is performed by the software of processing units (not shown) connected directly to the nodes $101_{111}$, $101_{211}$, $101_{314}$, $101_{411}$, . . . on the primary transmission lines 111, and by the software of processing units (not shown) connected to the nodes $101_{112}$, $101_{122}$, $101_{123}$, $101_{124}$, . . . on the secondary transmission lines 113. The construction of the hardware of the ring transmission system of the present embodiment is the same as that of the ring transmission system shown in FIGS. 6 and 7, and a description thereof will be omitted.

For the sake of convenience, in the following description, it is supposed that the processing unit $102_{111}$ connected to the node $101_{111}$ performs the operation shown in FIG. 13, and the processing unit $102_{112}$ ($102_{121}$ through $102_{124}$) connected to the node $101_{112}$ ($102_{121}$ through $102_{124}$) performs the operation shown in FIG. 13, for the sake of convenience.

Referring to FIG. 13, the processing unit $102_{111}$ at step S40 reads out a quantity of the management data stored in the transmitting buffer $147_{111}$ at a predetermined frequency (that is a predetermined period of time).

After the step S40 is performed, step S42 is performed. Step S42 detects whether the quantity of the stored management data is above a threshold value. The threshold value indicates an upper limit of the quantity of data that can be transmitted on the transmission lines 111 without causing congestion and allocated with respect to the management data. When the result at the step S42 is negative, the procedure is transferred again to the step S42 at the start of a following cycle.

When the result at the step S42 is affirmative, step S44 is performed. Step S44 generates and stores a congestion warning notification in the transmitting buffer $147_{111}$. The node $101_{111}$ transmits the cell including the congestion warning notification as part of the management data, to the secondary transmission lines 113.

After the step S44 is performed, step S46 is performed. Step S46 detects whether the quantity of the stored management data is below the threshold value. When the result at the step S46 is negative, the procedure is transferred again to the step S46 at the start of the following cycle.

When the result at the step S46 is affirmative, step S48 is performed. Step S48 generates and stores a non-congestion notification in the transmitting buffer $147_{111}$. The node $101_{111}$ transmits the cell including the non-congestion notification as part of the management data, to the secondary transmission lines 113.

After the step S48 is performed, the procedure is transferred to the step S40 at the start of the following cycle.

The processing unit $102_{112}$ ($102_{121}$ through $102_{124}$) connected to the node $101_{112}$ ($102_{121}$ through $102_{124}$) at step S50 detects whether the cell including the management data from the node $101_{111}$ is received from the secondary transmission lines 113. When the result at the step S50 is negative, the procedure is transferred again to the step S50 at the start of a following cycle. When the result at the step S50 is affirmative, step S52 is performed.

Step S52 detects whether the management data of the received cell indicates the congestion warning notification. When the result at the step S52 is negative, step S56 is performed.

When the result at the step S52 is affirmative, step S54 is performed. Step S54 notifies the exclusion control unit $104_{112}$ of the node $101_{112}$ about the congestion warning notification. The exclusion control unit $104_{112}$ at this time defers the transmission of following management data to the secondary transmission lines 113.

Step S56 detects whether the management data of the received cell indicates the non-congestion notification. When the result at the step S56 is negative, the procedure is transferred again to the step S56 at the start of the following cycle.

When the result at the step S56 is affirmative, step S58 is performed. Step S58 notifies the exclusion control unit 104 of the node $101_{112}$ about the non-congestion notification. The exclusion control unit $104_{112}$ at this time cancels the deferred transmission of following management data to the secondary transmission lines 113.

It is possible for the present embodiment to reliably prevent the congestion of the primary transmission lines 111. In order to attain this purpose, it is not necessary for the present embodiment to modify the construction of the hardware of the ring transmission system.

The construction of the hardware of the ring transmission system of the present embodiment in FIG. 13 is the same as that of the ring transmission system of the second embodiment in FIGS. 6 and 7. However, the present invention is not limited to this embodiment. The present embodiment in FIG. 13 is also applicable to other embodiments of the present invention previously described.

In the present embodiment, in order to prevent the congestion of the primary transmission lines 111, the nodes on the secondary transmission lines 113 defer the transmission of the management data thereto. However, it is possible to modify the present embodiment such that the ring transmission system includes nodes arranged on tertiary or other lower-order transmission lines and the nodes defer the transmission of the management data thereto.

Next, a description will be given of another operation of the ring transmission system of the sixth embodiment with reference to FIGS. 5 and 10.

The operation in this embodiment is performed by the software of the processing units $102_1$ through $102_N$ connected to the nodes $101_{11}$ through $101_{1N}$ (the nodes $101_{21}$ through $101_{2N}$) and by the software of the header analysis units $103_{11}$ through $103_{1N}$ (the header analysis units $103_{21}$ through $103_{2N}$). The construction of the hardware of the ring transmission system is the same as that of the ring transmission system shown in FIG. 5, and a description thereof will be omitted.

When the cell including the management data is transmitted to all the nodes on the transmission lines, the processing unit 102 sets the destination of the cell at a special destination. As shown in FIG. 10, the header field of the cell includes a special destination field BC which is used instead of the destination address DA. The processing unit 102 sets the special destination BC of the cell at a special value that is different from the destination addresses of all the nodes, and stores the cell including the special destination in the transmitting buffer 147 of the node 101.

The operations of the elements of the node 101 related to the transmission of the management data are the same as those in the previous embodiment, and a description thereof will be omitted.

In each of the nodes which receive the cell including the management data from the transmission lines 142, the extracting unit sends the cell including the management data to the header analysis unit 103. The header analysis unit 103 detects whether the destination of the received cell indicates the special destination BC. When the result of the detection is negative (the special destination BC is not indicated), the header analysis unit 103 stores the cell including the management data in the receiving buffer 146 or the intermediate buffer 106, similarly to the previous embodiments.

When the result of the detection is affirmative (the special destination BC is indicated), the header analysis unit 103 stores the cell including the management data (with the special destination BC) in both the receiving buffer 146 and the intermediate buffer 106. Thus, the header analysis unit 103 generates both the cell including the management data for the node 101 and the cell including the management data for another node 101 when the node 101 receives the cell including the special destination BC from the transmission lines 142.

Accordingly, in the present embodiment, when the cell is transmitted to all the nodes on the transmission lines, it is possible to efficiently transmit the management data of the cell to all the nodes on the transmission lines by setting the special destination. It is not necessary for the present embodiment to generate the individual destination addresses of such nodes for the transmission of the management data.

Next, a description will be given of another operation of the ring transmission system of the sixth embodiment with reference to FIGS. 5 and 10.

The operation in this embodiment is performed by the software of the processing units $102_1$ through $102_N$ connected to the nodes $101_{11}$ through $101_{1N}$ (the nodes $101_{21}$ through $101_{2N}$) and by the software of the header analysis units $103_{11}$ through $103_{1N}$ (the header analysis units $103_{21}$ through $103_{2N}$). The construction of the hardware of the ring transmission system is the same as that of the ring transmission system shown in FIG. 5, and a description thereof will be omitted.

When the cell including the management data is transmitted to all the nodes on the transmission lines, the processing unit 102 sets a relay number of the cell being transmitted. The relay number indicates the number of transmissions of the cell to the adjacent nodes serving as the intermediate node. As shown in FIG. 10, the header field of the cell includes a relay number field LIFE which is used in addition to the special destination field BC. The processing unit 102 sets the relay number LIFE of the cell at the number of transmissions of the cell to the adjacent nodes serving as the intermediate node, and stores the cell including the special destination BC and the relay number LIFE in the transmitting buffer 147 of the node 101.

The operations of the elements of the node 101 related to the transmission of the management data are the same as the operations of corresponding elements of the node 101 in the previous embodiments, and a description thereof will be omitted.

In each of the nodes 101 which receive the cell including the management data from the transmission lines 142, the extracting unit 107 sends the cell including the management data to the header analysis unit 103. The header analysis unit 103 detects whether the destination of the received cell indicates the special destination BC. When the result of the detection is negative (the special destination BC is not indicated), the header analysis unit 103 stores the cell including the management data in the receiving buffer 146 or the intermediate buffer 106, similarly to the previous embodiments.

When the result of the detection is affirmative (the special destination BC is indicated), the header analysis unit 103 stores the cell including the management data in the receiving buffer 146. Further, the header analysis unit 102 decrements the relay number LIFE contained in the received cell. When the resulting relay number is equal to one or above, the header analysis unit 103 stores the cell including the management data (with the decremented relay number) in the intermediate buffer 106. When the resulting relay number is equal to zero, the header analysis unit 102 deletes the cell including the management data and does not access the intermediate buffer 106.

Accordingly, in the present embodiment, when the cell is transmitted to all the nodes on the transmission lines, it is possible to efficiently transmit the management data of the cell to all the nodes on the transmission lines by setting an appropriate value of the relay number LIFE.

In the present embodiment, it is possible to determine the location of the destination node to which the management data of the cell is transmitted via the intermediate nodes, by setting the value of the relay number LIFE in the cell. It is possible to omit the special destination BC in the management data of the cell.

Next, a description will be given of a further operation of the ring transmission system of the sixth embodiment with reference to FIGS. 5 and 10.

The operation in this embodiment is performed by the software of the processing units $102_1$ through $102_N$ connected to the nodes $101_{11}$ through $101_{1N}$ (the nodes $101_{21}$ through $101_{2N}$) and by the software of the header analysis units $103_{11}$ through $103_{1N}$ (the header analysis units $103_{21}$ through $103_{2N}$). The construction of the hardware of the ring transmission system is the same as that of the ring transmission system shown in FIG. 5, and a description thereof will be omitted.

When the cell including the management data is transmitted to a group of nodes (for example, the nodes $101_{11}$ and $101_{12}$) on the transmission lines, the processing unit 102 sets the destination of the cell at a special destination. Similarly to the previous embodiment, the processing unit 102 sets the special destination BC of the cell at a special value that is different from the destination addresses of all the nodes, and stores the cell including the special destination in the transmitting buffer 147 of the node 101.

The operations of the elements of the node 101 related to the transmission of the management data are the same as those of the previous embodiments, and a description thereof will be omitted.

In each of the nodes which receive the cell including the management data from the transmission lines 142, the extracting unit 107 sends the cell including the management data to the header analysis unit 103. The header analysis unit 103 detects whether the destination of the received cell indicates the special destination BC. When the result of the detection is negative (the special destination BC is not indicated), the header analysis unit 103 stores the cell including the management data in the receiving buffer 146 or the intermediate buffer 106, similarly to the previous embodiments.

When the result of the detection is affirmative (the special destination BC is indicated), the header analysis unit 103 stores the cell including the management data (with the special destination BC) in the receiving buffer 146 only. The above cell is not stored in the intermediate buffer 106 by the header analysis unit 103. Thus, the header analysis unit 103 generates the cell including the management data for the node 101 when the node 101 receives the cell including the special destination BC.

Accordingly, in the present embodiment, when the cell is transmitted to all the nodes on the transmission lines, it is possible to efficiently transmit the management data of the cell to all the nodes on the transmission lines by setting the special destination BC. It is not necessary for the present embodiment to generate the individual destination addresses of such nodes for the transmission of the management data. The operation related to the transmission of the management data can be simplified.

Figure 14:
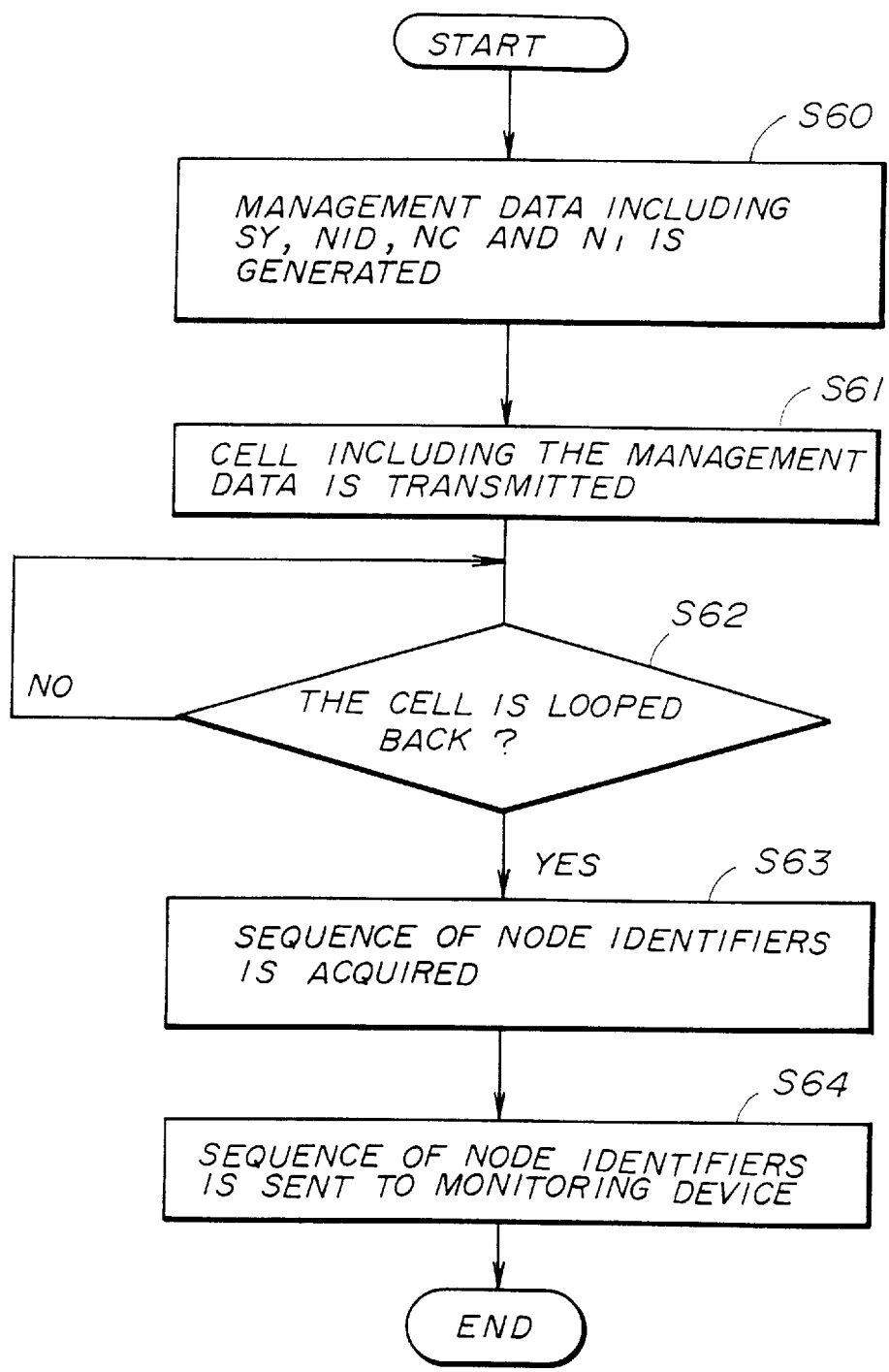
FIG. 14 is a flowchart for explaining an operation of a ring transmission system in a seventh embodiment of the present invention.
Figure 15:
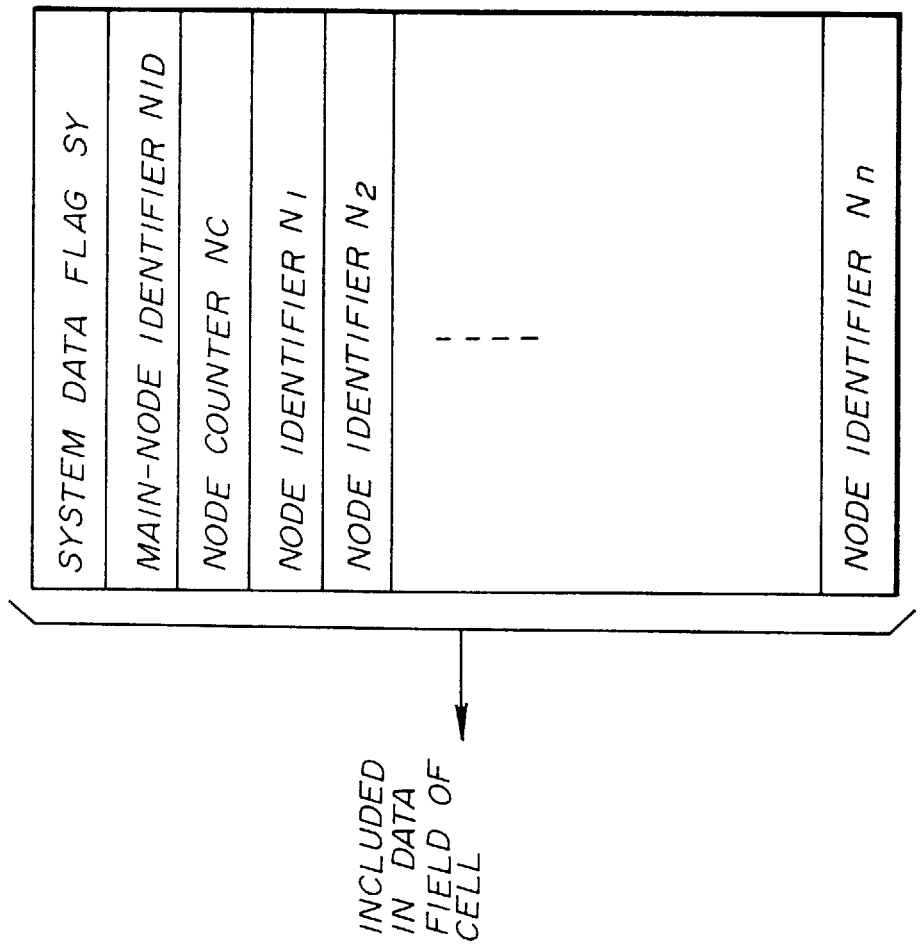
FIG. 15 is a diagram showing the format of looped-back data in a data field of a cell.

Next, a description will be given of an operation of a ring transmission system in a seventh embodiment of the present invention with reference to FIGS. 6, 14 and 15. FIG. 14 shows the operation of the ring transmission system of the present embodiment. FIG. 15 shows the format of looped-back data in a data field of a cell.

The operation in the present embodiment is performed by the software of the processing unit connected to each node in the ring transmission system. The construction of the hardware of the ring transmission system is the same as that of the ring transmission system shown in FIG. 6, and a description thereof will be omitted.

In the present embodiment, the cell including the management data is transmitted through the primary transmission lines 111 and the secondary transmission lines $113_{11}$, $113_{12}$ and $113_{31}$. As shown in FIGS. 10 and 15, the data field of the cell includes looped-back data. The looped-back data, included in the data field of the cell, comprises a system data flag SY, a main-node identifier NID, a node counter NC, and a plurality of node identifiers $N_1, N_2, \ldots, N_n$.

In the following description, it is supposed that the primary transmission lines 111 and the secondary transmission lines $113_{11}$, $113_{12}$ and $113_{31}$ have no redundant structure, for the sake of convenience.

In the ring transmission system, shown in FIG. 6, when a request for a sequence of node identifiers of the nodes arranged on the transmission lines in the ring transmission system is input by an operator on the monitoring device $114_1$, the monitoring device $114_1$ sends a notification of the request to the processing unit $102_{124}$ (not shown) connected to the node $101_{124}$.

Referring to FIG. 14, when the notification from the monitoring device $114_1$ is received, the processing unit $102_{124}$ at step S60 generates the management data (or the looped-back data) of a cell, including the system data flag SY equal to zero (SY=0), the main-node identifier NID and the node identifier $N_1$ both equal to an identification of the node $101_{124}$, and the node counter NC equal to one (NC=1).

The processing unit $102_{124}$ at step S61 transmits a cell including the management data to the secondary transmission lines $113_{12}$ via the node $101_{124}$. The cell including the management data is transmitted to the node $101_{123}$ on the secondary transmission lines $113_{12}$. It is supposed that the management data of the cell includes the special destination BC, for the sake of convenience. When the cell including the management data is received, the processing unit $102_{123}$, connected to the node $101_{123}$, increments the node counter NC (NC=NC+1) of the looped-back data in the data field of the received cell. Also, the processing unit $102_{123}$ adds an identification of the node $101_{123}$ to the node identifier $N_2$ of the looped-back data of the received cell. The management data of the cell is updated in this manner by the processing unit $102_{123}$.

Further, the processing unit $102_{123}$ transmits the cell including the management data (updated) from the node $101_{123}$ to the node $101_{122}$ on the secondary transmission lines $113_{12}$. The intermediate transmission of the cell including the management data is performed.

The cell including the management data is transmitted to and received by the nodes $101_{122}$, $101_{121}$, $101_{112}$, $101_{111}$, $101_{211}$, $101_{311}$, $101_{312}$, $101_{313}$, $101_{314}$, and $101_{411}$ in the same manner. These nodes perform the updating and the intermediate transmission of the cell including the management data which are the same as those performed by the node $101_{123}$.

When the cell including the management data from the node $101_{411}$ is received by the node $101_{124}$, the processing unit $102_{124}$ at step S62 detects whether the main-node identifier NID contained in the received cell is equal to the identification of the node $101_{124}$ by comparing them to each other. When the result at the step S62 is affirmative (they accord with each other), it is determined that the cell including the management data is looped back in the ring transmission system.

The comparison operation mentioned above is also performed by the processing units connected to the nodes $101_{122}$, $101_{121}$, $101_{112}$, $101_{111}$, $101_{211}$, $101_{311}$, $101_{312}$, $101_{313}$, $101_{314}$, and $101_{411}$. However, a description thereof is omitted.

When the result at the step S62 is affirmative, the processing unit $101_{124}$ at step S63 acquires a sequence of the node identifiers $N_1$ through $N_n$ contained in the looped-back data of the received cell. That is, the processing unit $101_{411}$ acquires a sequence of the node identifiers of the nodes arranged on the secondary transmission lines, the primary transmission lines and the secondary transmission lines, and the secondary nodes arranged on the primary transmission lines. When the result at the step S62 is negative, the procedure is transferred again to the step S63.

Further, the processing unit $101_{124}$ at step S64 sends the sequence of the node identifiers to the monitoring device $114_1$. Therefore, the operator on the monitoring device $114_1$ can obtain the sequence of the node identifiers of the nodes arranged on the transmission lines in the ring transmission system.

From the foregoing, it is readily understood that the ring transmission system of the present embodiment comprises a node identifier setting unit which sets a specific field of the cell at a node identifier of the node when the node serves as the intermediate node and receives the cell including the management data for the another node from the separating unit. The ring transmission system of the present embodiment comprises a node sequence unit which acquires a sequence of node identifiers from the nodes on the transmission lines when the node serves as the source node and receives the cell including the management data for the node from the separating unit after the cell is looped back.

In the present embodiment, it is possible to acquire a sequence of node identifiers of the nodes arranged on the transmission lines. The sequence of node identifiers can be used for the maintenance and operation of the ring transmission system. To attain this purpose, it is not necessary to modify the construction of the hardware of the ring transmission system.

In the present embodiment, it is supposed that the transmission lines in the ring transmission system have no redundant structure. However, the present embodiment can be applied to a ring transmission system including transmission lines having a redundant structure by setting the system data flag at another value which indicates the redundant structure.

Figure 16:
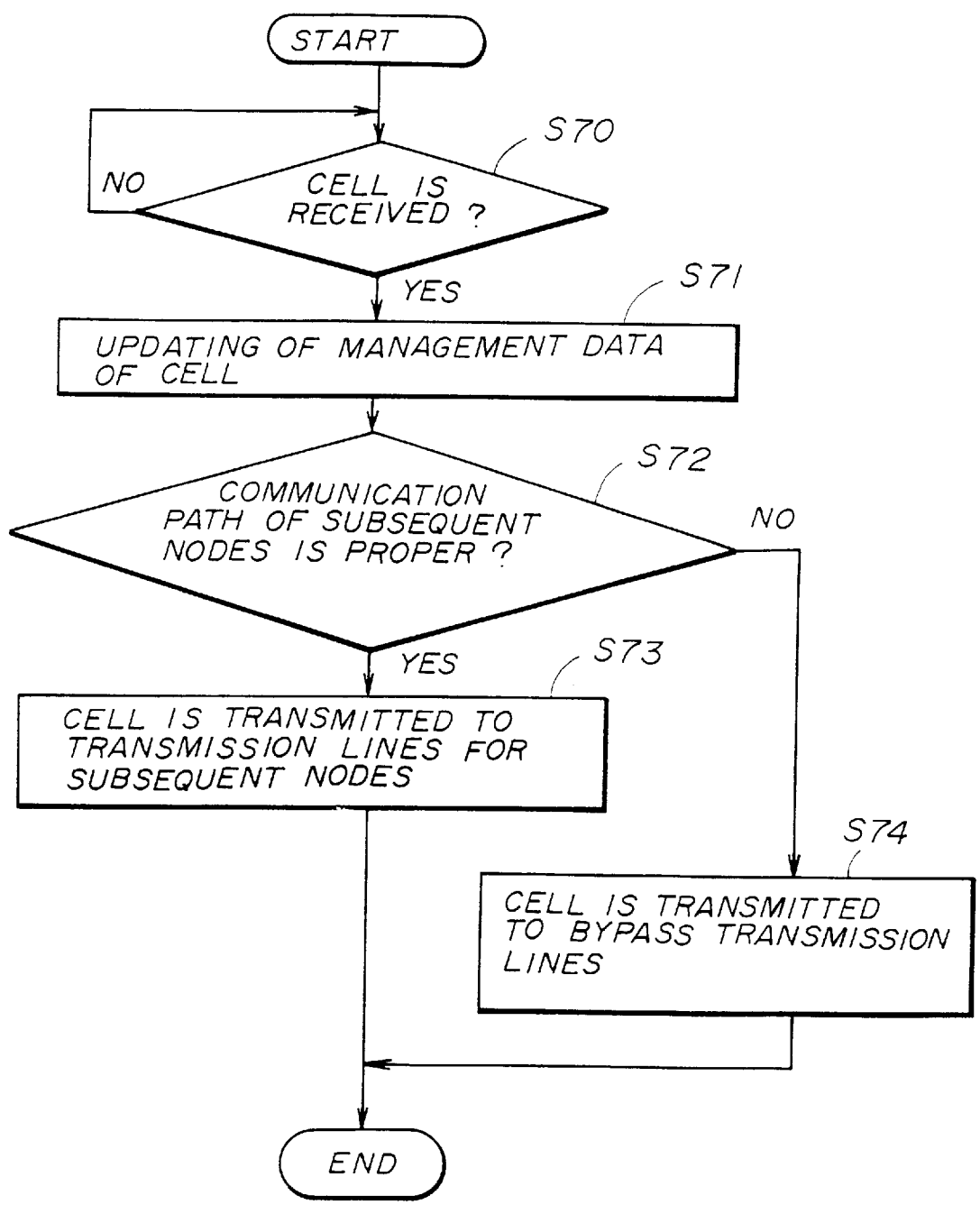
FIG. 16 is a flowchart for explaining an operation of a ring transmission system in an eighth embodiment of the present invention.

FIG. 16 shows an operation of a ring transmission system in an eighth embodiment of the present invention.

The operation in the present embodiment is performed by the software of the processing unit connected to each of the nodes $101_{123}$, $101_{122}$, $101_{121}$, $101_{112}$, $101_{111}$, $101_{211}$, $101_{311}$, $101_{312}$, $101_{313}$, $101_{314}$, and $101_{411}$ arranged in the ring transmission system. The construction of the hardware of the ring transmission system is the same as that of the ring transmission system shown in FIG. 6, and a description thereof will be omitted.

In the present embodiment, bypass transmission lines between the source node and the intermediate node are formed with the transmission lines when the destination is set at a special destination indicating that the cell is transmitted to all the nodes on the transmission lines.

In the present embodiment, each of the nodes $101_{123}$, $101_{122}$, $101_{121}$, $101_{112}$, $101_{111}$, $101_{211}$, $101_{311}$, $101_{312}$, $101_{313}$, $101_{314}$, and $101_{411}$, in association with the processing units connected to these nodes, detects whether a communication path of subsequent nodes on the transmission lines is proper in accordance with the communication control procedure when the node serves as the intermediate node and receives the cell from the source node. Each of the above nodes transmits the cell to the bypass transmission lines when the communication path is detected improper.

The time the above detection on the correctness of the communication path of the subsequent nodes is performed is not limited to the time of the intermediate transmission. Performing the above detection may be repeated at a predetermined frequency (that is a predetermined period of time).

Referring to FIG. 16, the processing unit $102_{123}$ connected to the node $101_{123}$ at step S70 detects whether the cell including the management data from the node $101_{124}$ is received. When the cell is received, the processing unit $102_{123}$ at step S71 performs the updating of the management data (the looped-back data) of the received cell. On the other hand, when the result at the step S70 is negative, the procedure is transferred back to the step S70.

After the step S71 is performed, the processing unit $102_{123}$ at step S72 detects whether a communication path of subsequent nodes on the transmission lines is proper in accordance with the communication control procedure used by the transmission lines.

When the result at the step S72 is affirmative (the communication path is detected proper), the processing unit $102_{123}$ at step S73 performs the intermediate transmission of the cell from the node $101_{123}$ to the subsequent nodes.

When the result at the step S72 is negative (the communication path is detected improper), the processing unit $102_{123}$ at step S74 transmits the cell to the bypass transmission lines. Before the transmission of the cell, the processing unit $102_{123}$ generates the cell by setting a state indication flag in the data field of the cell (updated) at a value indicating the incorrectness of the communication path and setting the destination address DA in the header field of the cell at the node identifier of the main-node identifier NID. The bypass transmission lines are, for example, one of the secondary transmission lines $113_{12}$ which have a redundant structure. At the step S74, the cell from the node $101_{123}$ is transmitted back to the node $101_{124}$ via the bypass transmission lines.

When the cell from the node $101_{123}$ is received, the processing unit $102_{124}$ performs the operation of the previous embodiment in FIG. 14.

Accordingly, even when a failure of the communication path occurs, it is possible for the present embodiment to reliably acquire a sequence of node identifiers of the nodes arranged on the transmission lines in the ring transmission system.

Next, a description will be given of an allocation of a destination address used by the ring transmission system of the present invention with reference to the accompanying drawings.

The control field of the cell, shown in FIG. 10, includes the destination address field DA. The cell is transmitted and received between the nodes on the transmission lines within the ring transmission system of the present invention.

As shown in FIG. 10, the destination address field DA of the cell includes a layer address DL and a node address DN. The layer address DL indicates a layer on which the destination node of the cell being received is located in the network. The node address DN identifies the destination node as being one of the nodes which are located on the layer.

The destination address, containing the layer address DL and the node address DN, is allocated to each of the nodes provided within the ring transmission system. In the ring transmission system, the nodes on the transmission lines and the nodes on the secondary transmission lines are linked in a hierarchical formation such that the layer address and the node address are allocated to each node of the individual transmission lines within the ring transmission system.

In the present embodiment, the processing unit, to which the source node of the cell to be transmitted is connected, generates a destination address including a specific layer address DL and a specific node address DN. The destination address indicates the location of the destination node in the ring transmission system.

When the cell is received by one of the individual nodes on the transmission lines and the secondary transmission lines, the header analysis unit of the node determines whether the specified DL and the specified DN of the destination address of the cell are equal to the allocated DL and the allocated DN of the node. When they accord with each other, the header analysis unit stores the management data including the destination address in the receiving buffer of the node. When they do not accord, the header analysis unit stores the management data including the destination address in the intermediate buffer of the node.

The above operations of the elements of each node are the same as those of the corresponding elements of the nodes previously described on the previous embodiments, and a description thereof will be omitted.

Figure 17:
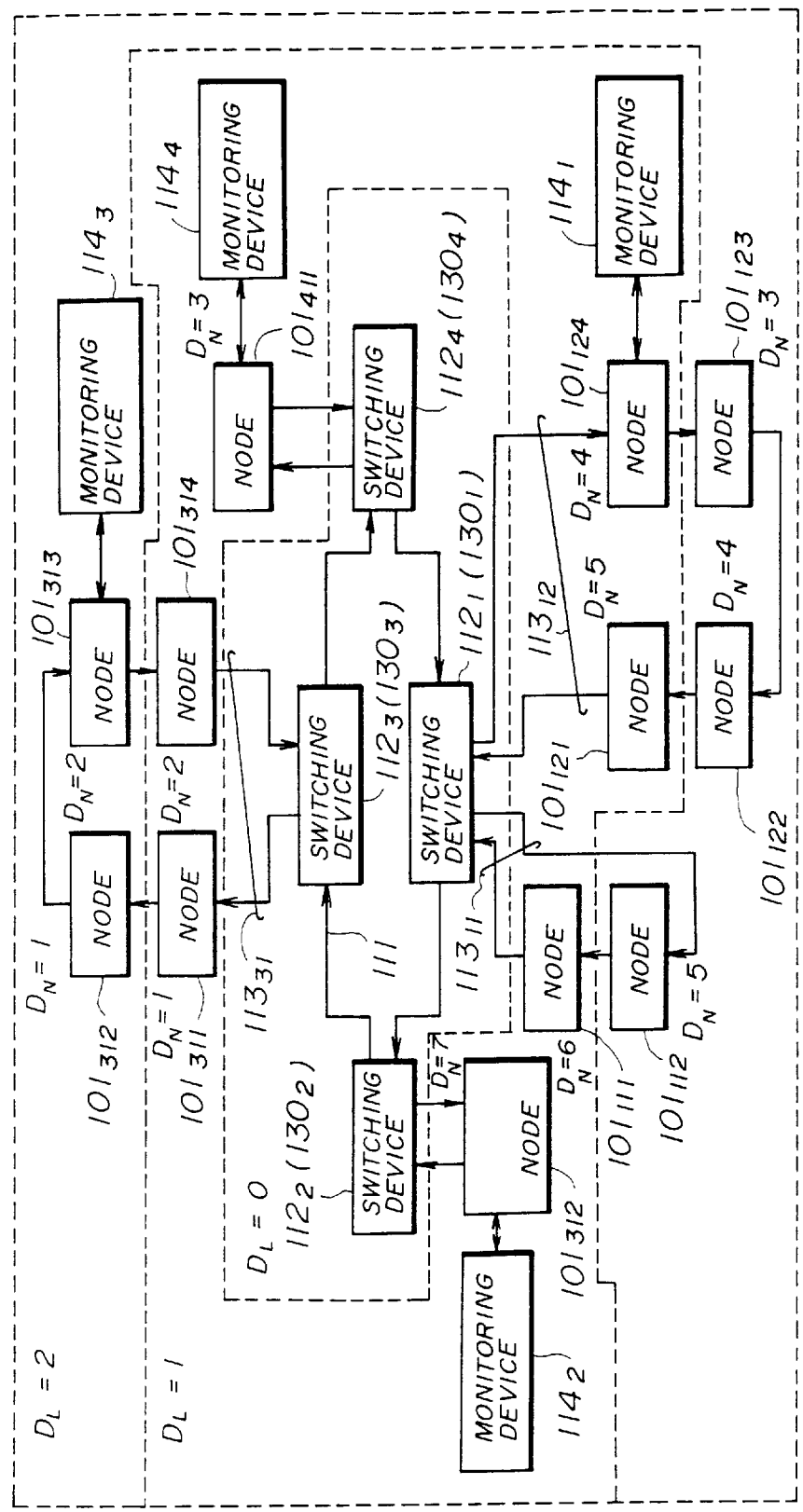
FIG. 17 is a diagram showing an allocation of a destination address used by the ring transmission system of the present invention.

FIG. 17 shows an allocation of the destination address DA used by the ring transmission system of the present invention.

Referring to FIG. 17, in the present embodiment, the nodes on the transmission lines and the nodes on the secondary transmission lines are linked in a hierarchical formation such that the destination address DA (containing the layer address DL and the node address DN) is allocated to each node of the individual transmission lines within the ring transmission system.

In the present embodiment, the correspondence between the nodes and the layers in the network is predetermined by using the destination address DA described above. The management data of the cell from the source node is efficiently transmitted to the destination node via the intermediate node. It is not necessary that the individual nodes determine the location of the destination node by analyzing the management data of the cell in accordance with the correspondence between the nodes and the layers in the network.

In the present embodiment, the layer address DL and the node address DN, contained in the destination address DA, are allocated to each node of the individual transmission lines in the network. However, the present invention is not limited to this embodiment. For example, a node address indicating all the nodes (or a specific node) located on the subject layer in the network may be used instead of the node address of the present embodiment.

FIG. 18 through FIG. 21 show different allocations of another destination address used by the ring transmission system of the present invention.

Figure 18:
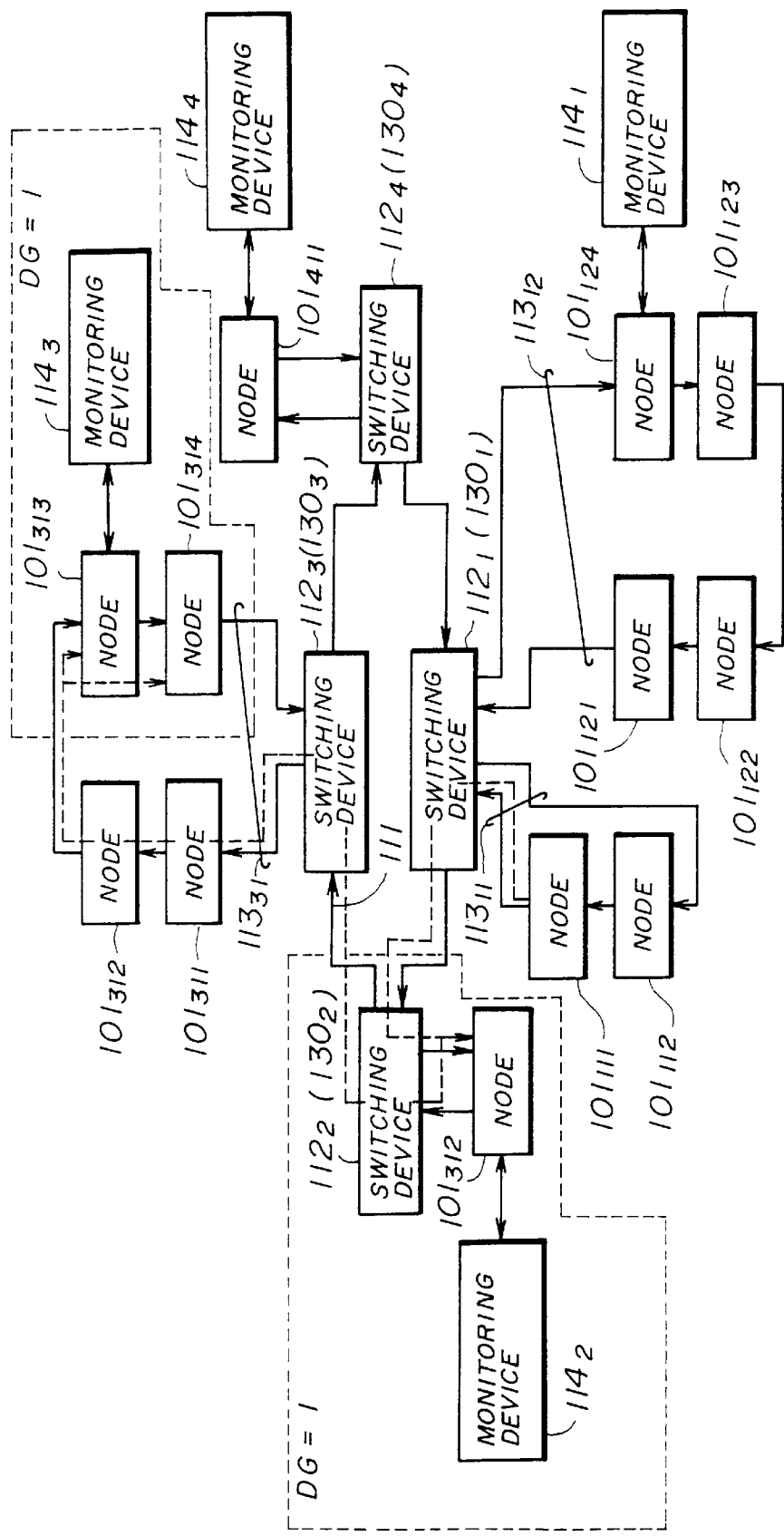
FIGS. 18 through 21 are diagrams showing different allocations of a group identifier used by the ring transmission system of the present invention.

Referring to FIG. 18, in the present embodiment, the location of the destination node is defined by a group identifier DG, instead of the destination address DA containing the layer address DL and the node address DN used in the previous embodiment. The group identifier DG is also included in the header field of the cell shown in FIG. 10. The group identifier DG is allocated in common to a group of nodes, among the nodes on the transmission lines and the nodes on the secondary transmission lines, which have a predetermined attribute. In the present embodiment, the group identifier DG which is equal to 1 (DG=1) is used.

Figure 19:
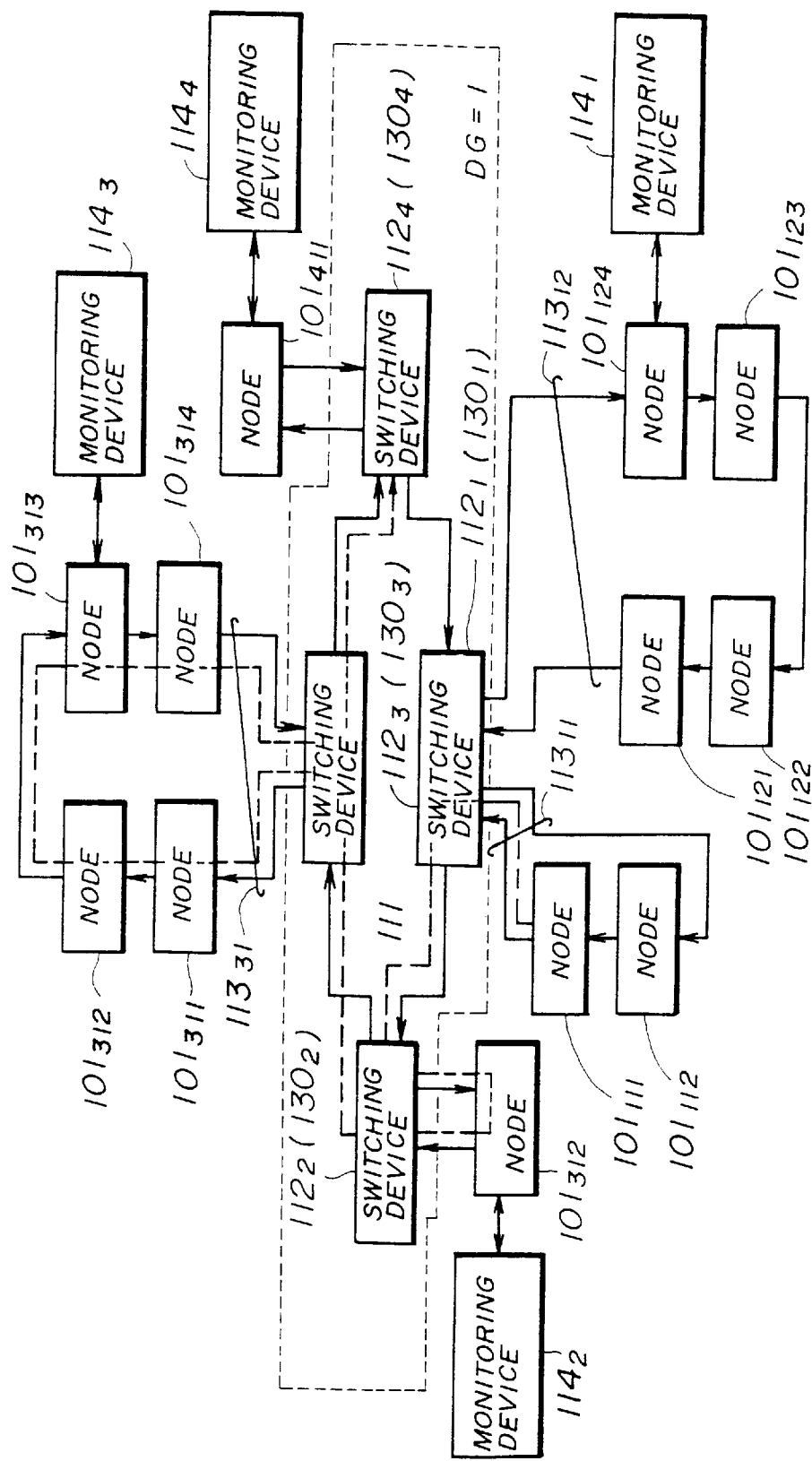

In FIG. 19, the group identifier DG is allocated in common to a group of nodes having a predetermined attribute, indicating that the nodes are provided on the transmission lines in the ring transmission system.

Figure 20:
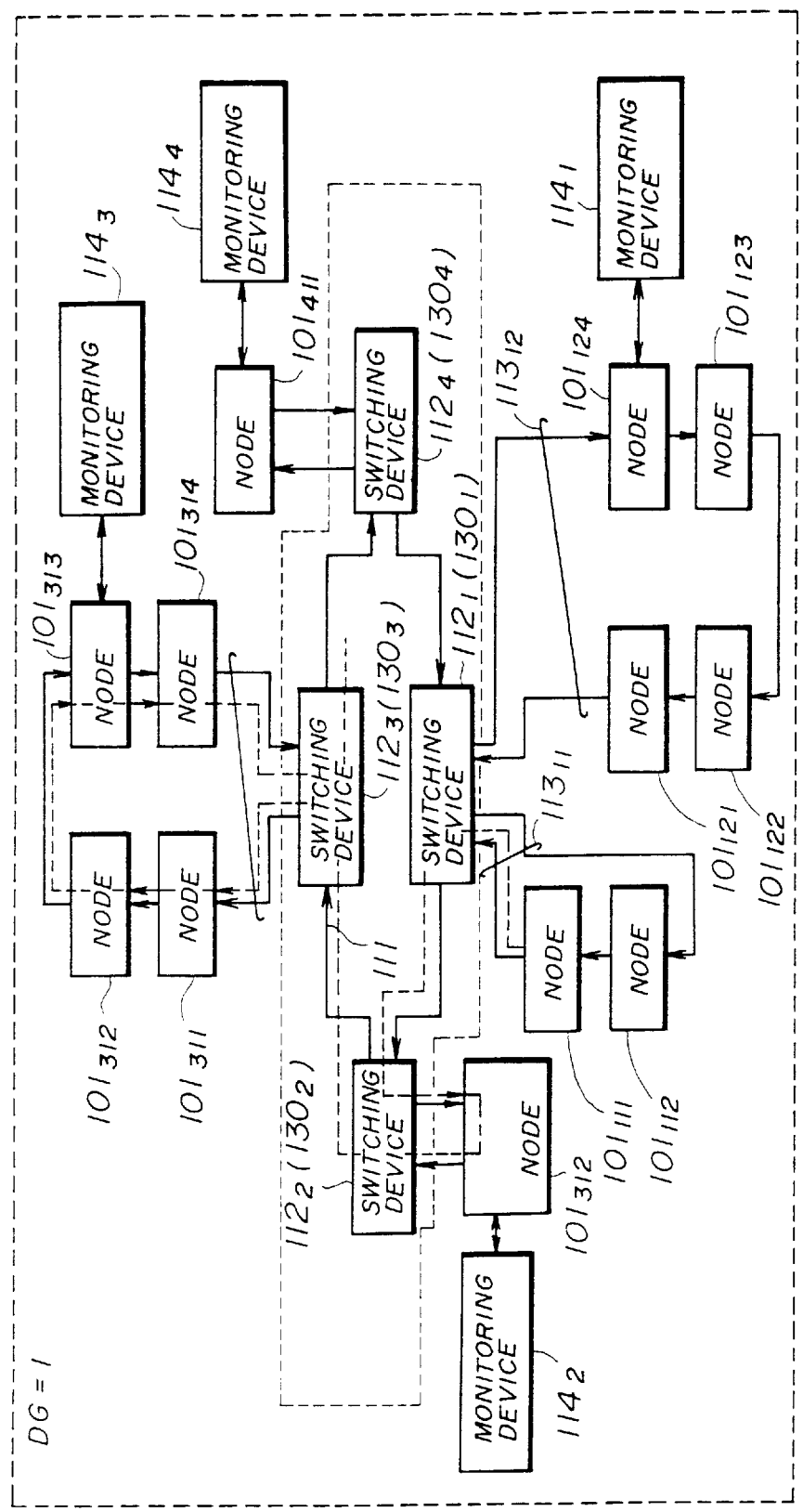

In FIG. 20, the group identifier DG is allocated in common to a group of nodes having a predetermined attribute, indicating that the nodes are provided on the secondary transmission lines in the ring transmission system.

Figure 21:
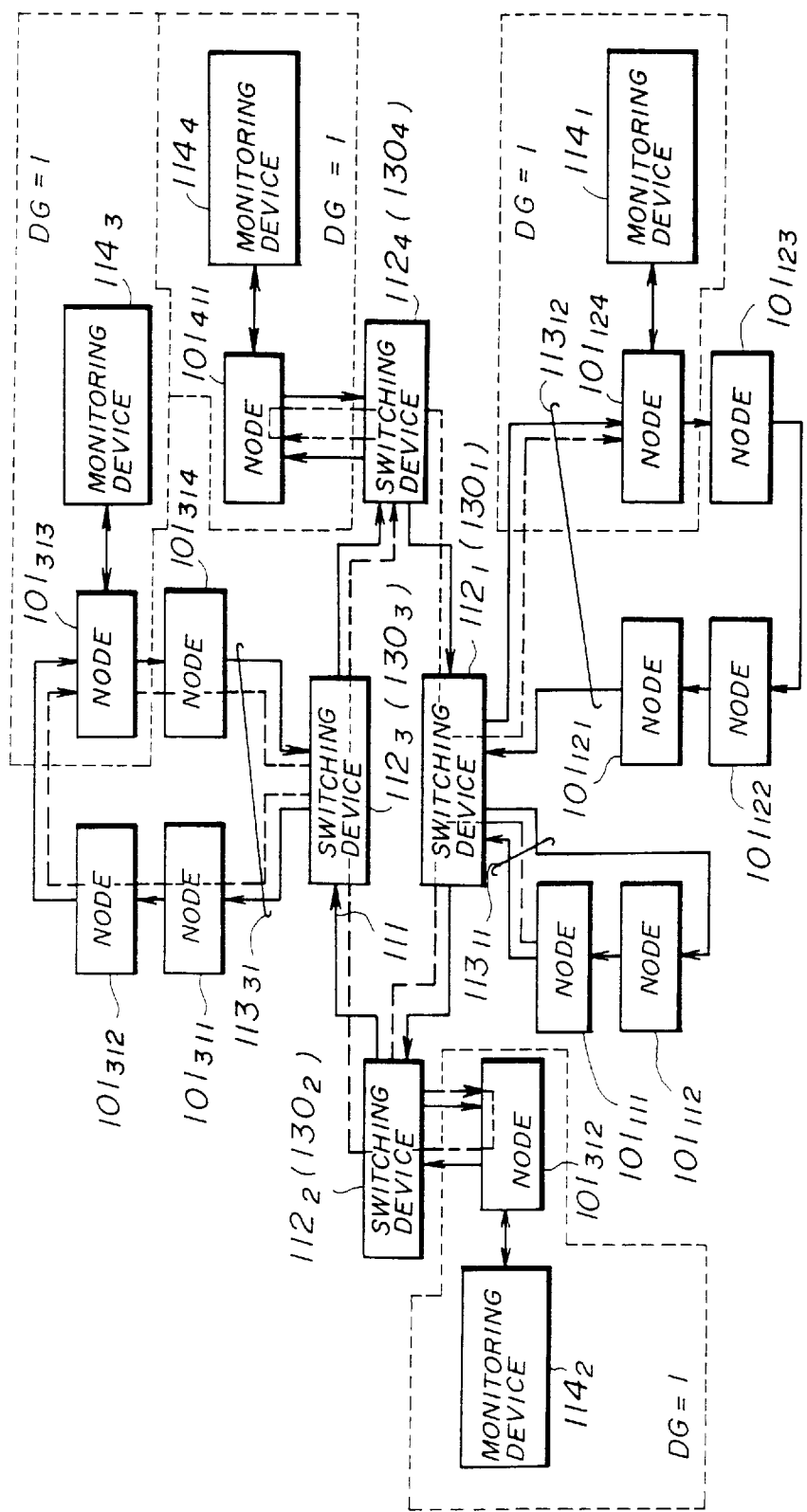

In FIG. 21, the group identifier DG is allocated in common to a group of nodes having a predetermined attribute, indicating that the nodes are connected to the monitoring devices providing a man-machine interface related to the management data.

The embodiments described above with reference to FIGS. 17 through 21 are also applicable to any of the ring transmission systems of the embodiments previously described with reference to FIGS. 2 through 16.

Further, the present invention is not limited to the above-described embodiments, and variations and modifications may be made without departing from the scope of the present invention.

What is claimed is:

1. A ring transmission system in which nodes are connected in a ring shape by transmission lines to communicate with one another, each of said nodes providing a communication interface as one of a source node, a destination node or an intermediate node when a cell from the source node is transmitted to the destination node via the intermediate node on the transmission lines, each of said nodes comprising:

a cell extracting unit receiving the cell from the transmission lines and separating a control field from the cell in accordance with a communication control procedure used by the transmission lines, said control field including a number of bits, separatable from message data included in said cell, containing management data and a destination, said management data indicating information related to maintenance and operation of the ring transmission system;

a separating unit separating, from the control field from said cell extracting unit, one of management data for said node and management data for another node by comparing said destination with an identification of said node;

a management data processing unit generating processed management data from the management data supplied by said separating unit when said destination indicates that the management data is for said node; and an intermediate unit generating a new cell containing the management data supplied by said separating unit when said destination indicates that the management data is for another node, said management data of said new cell being distinctly different from the processed management data generated by said management data processing unit, said intermediate unit transmitting said new cell to the transmission lines.

2. A ring transmission system in which nodes are connected in a ring shape by transmission lines to communicate with one another, each of said nodes providing a communication interface as one of a source node, a destination node or an intermediate node when a cell from the source node is transmitted to the destination node via the intermediate node on the transmission lines, each of said nodes comprising:

a cell extracting unit receiving the cell from the transmission lines and separating a control field from the cell in accordance with a communication control procedure used by the transmission lines, said control field including a number of bits, separatable from message data included in said cell, containing management data and a destination, said management data indicating information related to maintenance and operation of the ring transmission system;

a separating unit separating, from the control field from said cell extracting unit, one of management data for said node and management data for another node by comparing said destination with an identification of said node;

a management data processing unit generating processed management data from the management data supplied by said separating unit when said destination indicates that the management data is for said node; and an intermediate unit generating a new cell containing the management data supplied by said separating unit when said destination indicates that the management data is for another node, said management data of said new cell being distinctly different from the processed management data generated by said management data processing unit, said intermediate unit transmitting said new cell to the transmission lines;

secondary transmission lines connected to said transmission lines in a closed loop and using a communication control procedure which is the same as said communication control procedure of said transmission lines;

a connection converting unit provided on said transmission lines and connecting said transmission lines to said secondary transmission lines to allow extension of said transmission lines; and secondary nodes connected in a ring shape by said secondary transmission lines, said secondary nodes on said secondary transmission lines being the same as the nodes on the transmission lines.

3. A ring transmission system in which nodes are connected in a ring shape by transmission lines to communicate with one another, each of said nodes providing a communication interface as one of a source node, a destination node or an intermediate node when a cell from the source node is transmitted to the destination node via the intermediate node on the transmission lines, each of said nodes comprising:

a cell extracting unit receiving the cell from the transmission lines and separating a control field from the cell in accordance with a communication control procedure used by the transmission lines, said control field including a number of bits, separatable from message data included in said cell, containing management data and a destination, said management data indicating information related to maintenance and operation of the ring transmission system;

a separating unit separating, from the control field from said cell extracting unit, one of management data for said node and management data for another node by comparing said destination with an identification of said node;

a management data processing unit generating processed management data from the management data supplied by said separating unit when said destination indicates that the management data is for said node; and an intermediate unit generating a new cell containing the management data supplied by said separating unit when said destination indicates that the management data is for another node, said management data of said new cell being distinctly different from the processed management data generated by said management data processing unit, said intermediate unit transmitting said new cell to the transmission lines;

a plurality of groups of sub-transmission lines respectively connected to said transmission lines in a closed loop and using a communication control procedure which is the same as the communication control procedure of said transmission lines;

secondary nodes individually connected in a ring shape by one of said groups of sub-transmission lines, the secondary nodes on said groups of sub-transmission lines being the same as the nodes on the transmission lines; and a switching device provided on said transmission lines and selectively connecting said transmission lines to one of said groups of sub-transmission lines, said switching device selecting said one of said groups to which said transmission lines are connected when the cell is transmitted to one of the secondary nodes on said one of said groups of sub-transmission lines.

4. The ring transmission system according to claim 3, wherein said switching device comprises:

a storage unit storing a first cell being transmitted to the transmission lines for the nodes; and a notification unit generating a second cell including management data which indicates a quantity of data of the first cell stored in said storage unit, and transmitting the second cell to one of the groups of sub-transmission lines for the secondary nodes, wherein each of the secondary nodes further comprises:

a transmit control unit monitoring the second cell transmitted by said notification unit and deferring or canceling one of the transmission of a cell whose destination is one of the nodes on the transmission lines and the transmission of a cell whose destination is one of the secondary nodes on the one of the groups of sub-transmission lines when the quantity of data indicated by the management data of the second cell is above a threshold value.

5. A ring transmission system in which nodes are connected in a ring shape by transmission lines to communicate with one another, each of said nodes providing a communication interface as one of a source node, a destination node or an intermediate node when a cell from the source node is transmitted to the destination node via the intermediate node on the transmission lines, each of said nodes comprising:

a cell extracting unit receiving the cell from the transmission lines and separating a control field from the cell in accordance with a communication control procedure used by the transmission lines, said control field including a number of bits, separatable from message data included in said cell, containing management data and a destination, said management data indicating information related to maintenance and operation of the ring transmission system;

a separating unit separating, from the control field from said cell extracting unit, one of management data for said node and management data for another node by comparing said destination with an identification of said node;

a management data processing unit generating processed management data from the management data supplied by said separating unit when said destination indicates that the management data is for said node; and an intermediate unit generating a new cell containing the management data supplied by said separating unit when said destination indicates that the management data is for another node, said management data of said new cell being distinctly different from the processed management data generated by said management data processing unit, said intermediate unit transmitting said new cell to the transmission lines;

wherein the cell includes a binary flag indicating one of intermediate transmission and selective connection with respect to a type of the transmission of the cell, wherein said system further comprises:

a plurality of groups of sub-transmission lines respectively connected to said transmission lines in a closed loop and using ac communication control procedure which is the same as the communication control procedure of said transmission lines;

secondary nodes individually connected in a ring shape by one of said groups of sub-transmission lines, the secondary nodes on said groups of sub-transmission lines being the same as the nodes on the transmission lines; and a switching device provided on said transmission lines and selectively connecting said transmission lines to one of said groups of sub-transmission lines, said switching device performing one of the intermediate transmission and the selective connection in accordance with a value of the binary flag included in the cell.

6. A ring transmission system in which nodes are connected in a ring shape by transmission lines to communicate with one another, each of said nodes providing a communication interface as one of a source node, a destination node or an intermediate node when a cell from the source node is transmitted to the destination node via the intermediate node on the transmission lines, each of said nodes comprising:

a cell extracting unit receiving the cell from the transmission lines and separating a control field from the cell in accordance with a communication control procedure used by the transmission lines, said control field including a number of bits, separatable from message data included in said cell, containing management data and a destination, said management data indicating information related to maintenance and operation of the ring transmission system;

a separating unit separating, from the control field from said cell extracting unit, one of management data for said node and management data for another node by comparing said destination with an identification of said node;

a management data processing unit generating processed management data from the management data supplied by said separating unit when said destination indicates that the management data is for said node; and an intermediate unit generating a new cell containing the management data supplied by said separating unit when said destination indicates that the management data is for another node, said management data of said new cell being distinctly different from the processed management data generated by said management data processing unit, said intermediate unit transmitting said new cell to the transmission lines;

wherein each node further comprises:

a notification unit monitoring an operation of said node and generating a signal indicating a start of the operation of said node; and a bypass unit including a relay which interconnects an input line of the transmission lines on which a preceding adjacent node is located and an output line of the transmission lines on which a following adjacent node is located, said relay being turned ON when said signal is generated by said notification unit.

7. The ring transmission system according to claim 1, wherein the transmission lines have a redundant structure and the nodes have a redundant structure, wherein each node further comprises:

a time setting means setting a time stamp of the new cell at a specific time when the new cell is transmitted to the transmission lines; and a cell unifying means acquiring one of at least two cells from other nodes as a unified cell and deleting the other cells when the node receives said at least two cells from the transmission lines and the time stamps of said at least two cells indicate the same time.

8. The ring transmission system according to claim 1, wherein each cell further comprises:

a deletion-node setting means setting a deletion-node indication of the cell when the cell is transmitted to the transmission lines, said deletion-node indication indicating whether the cell is to be deleted by the node receiving the cell; and a cell deletion means determining whether the cell is to be deleted by the node in accordance with a value of the deletion-node indication, contained in the cell, when said node receives the cell including the deletion-node indication from the transmission lines.

9. The ring transmission system according to claim 2, wherein each node further comprises:

a congestion notifying means detecting whether a quantity of management data stored in a transmitting buffer of the node is above a threshold value and notifying the secondary nodes on the secondary transmission lines of a result of the detection of the quantity of the stored management data; and a transmission deferring means deferring the transmission of a cell whose destination is one of the nodes on the transmission lines when said node is one of the secondary nodes and notified that the quantity of the stored management data is above the threshold value.

10. The ring transmission system according to claim 1, further comprising a special destination setting means setting the destination of the cell at a special destination when the cell is transmitted to all the nodes on the transmission lines, wherein each node further comprises:

a converting means generating both the cell including the management data for said node and the cell including the management data for another node when said node serves as one of the intermediate node and the destination node and receives the cell including the special destination.

11. The ring transmission system according to claim 10, further comprising a relay number setting means setting a relay number of the cell, said relay number indicating the number of transmissions of the cell to the nodes serving as the intermediate node, wherein each node further comprises:

a relay number counting means decrementing said relay number contained in said cell when said node serves as one of the intermediate node and the destination node and receives the cell including the relay number, and said relay number counting means deleting said cell when the resulting relay number is equal to zero.

12. The ring transmission system according to claim 1, further comprising a special destination setting means setting the destination of the cell at a special destination when the cell is transmitted to all the nodes on the transmission lines, wherein each node further comprises:

a converting means generating the cell including the management data for said node when said node serves as one of the intermediate node and the destination node and receives the cell including the special destination.

13. The ring transmission system according to claim 10, further comprising a node identifier setting means setting a specific field of the cell at a node identifier of said node when said node serves as the intermediate node and receives the cell including the management data for the another node from said separating unit; and a node sequence means acquiring a sequence of node identifiers from the nodes on the transmission lines when said node serves as the source node and receives the cell including the management data for said node from said separating unit after the cell is looped back.

14. The ring transmission system according to claim 13, wherein bypass transmission lines between the source node and the intermediate node are formed with the transmission lines when the destination of the cell is set at a special destination indicating that the cell is transmitted to all the nodes on the transmission lines, and wherein each node further comprises:

a transmitting means detecting whether a communication path of subsequent nodes on the transmission lines is proper in accordance with the communication control procedure when said node serves as the intermediate node and receives the cell from the source node, and said transmitting means transmitting the cell to the bypass transmission lines when the communication path is detected improper.

15. The ring transmission system according to claim 2, wherein the nodes on the transmission lines and the secondary nodes on the secondary transmission lines are linked in a hierarchical formation such that a destination address is allocated to each node of the individual transmission lines, and wherein the management data contained in the cell includes a specific destination address having a layer address and a node address, said layer address indicating a layer on which the destination node is located in the ring transmission system, said node address identifying the destination node as one of the nodes include in said layer.

16. The ring transmission system according to claim 10, wherein said destination node is defined by a group identifier contained in the control field of the cell, said group identifier being allocated to a group of nodes, among the nodes on the transmission lines and the nodes on the secondary transmission lines, the group of nodes having a predetermined attribute in common.

17. The ring transmission system according to claim 16, wherein said group identifier is allocated to the nodes on the transmission lines in the ring transmission system.

18. The ring transmission system according to claim 16, wherein said group identifier is allocated to the nodes on the secondary transmission lines in the ring transmission system.

19. The ring transmission system according to claim 16, wherein said group identifier is allocated to the nodes which are connected to monitoring devices providing a man-machine interface related to the management data.

* * * * *